United States Patent
Foster et al.

(10) Patent No.: US 7,266,842 B2
(45) Date of Patent: *Sep. 4, 2007

(54) CONTROL FUNCTION IMPLEMENTING SELECTIVE TRANSPARENT DATA AUTHENTICATION WITHIN AN INTEGRATED SYSTEM

(75) Inventors: Eric M. Foster, Owego, NY (US); William E. Hall, Clinton, CT (US); Marcel-Catalin Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 847 days.

This patent is subject to a terminal disclaimer.

(21) Appl. No.: 10/125,708

(22) Filed: Apr. 18, 2002

(65) Prior Publication Data

US 2003/0200448 A1    Oct. 23, 2003

(51) Int. Cl.
```
G06F 7/04      (2006.01)
G06F 7/58      (2006.01)
G06F 12/00     (2006.01)
G06F 12/14     (2006.01)
G06F 13/00     (2006.01)
G06F 17/30     (2006.01)
G06K 19/00     (2006.01)
G11C 7/00      (2006.01)
H04L 9/32      (2006.01)
```

(52) U.S. Cl. ........................ 726/17; 713/190
(58) Field of Classification Search ............... 713/161, 713/151; 726/30

See application file for complete search history.

(56) References Cited

U.S. PATENT DOCUMENTS

| 4,168,396 A | 9/1979 | Best ........................... 178/22 |
| 4,465,901 A | 8/1984 | Best ........................ 178/22.08 |
| 4,797,853 A | 1/1989 | Savage et al. .............. 364/900 |
| 4,920,483 A | 4/1990 | Pogue et al. ................ 364/200 |
| 5,144,659 A | 9/1992 | Jones ........................... 380/4 |
| 5,421,006 A | 5/1995 | Jablon et al. ............... 395/575 |
| 5,440,713 A | 8/1995 | Lin et al. .................... 395/485 |
| 5,464,087 A | 11/1995 | Bounds et al. .............. 194/200 |

(Continued)

OTHER PUBLICATIONS

Foster et al., pending U.S. patent application entitled "Control Function With Multiple Security States For Facilitating Secure Operation Of An Integrated System", U.S. Appl. No. 10/125,115, co-filed herewith, Published as US PG Pub., Oct. 23, 2003.

(Continued)

*Primary Examiner*—Emmanuel L. Moise
*Assistant Examiner*—Nadia Khoshnoodi
(74) *Attorney, Agent, or Firm*—William H. Steinberg, Esq.; Kevin P. Radigan, Esq.; Heslin Rothenberg Farley & Mesiti, P.C.

(57) ABSTRACT

A data authentication technique is provided for a data access control function of an integrated system. The technique includes passing a data request from a functional master of the integrated system through the data access control function, and responsive to the data request, selectively authenticating requested data. The selective authentication, which can occur transparent to the functional master initiating the data request, includes employing integrity value generation on the requested data when originally stored and when retrieved, in combination with encryption and decryption thereof to ensure the authenticity of the requested data. As an enhancement, cascading integrity values may be employed to facilitate data authentication.

23 Claims, 17 Drawing Sheets

U.S. PATENT DOCUMENTS

| | | | |
|---|---|---|---|
| 5,491,827 A | 2/1996 | Holtey | 395/800 |
| 5,561,817 A | 10/1996 | McCormack et al. | 395/842 |
| 5,584,023 A * | 12/1996 | Hsu | 707/204 |
| 5,602,536 A | 2/1997 | Henderson et al. | 340/825.31 |
| 5,647,017 A | 7/1997 | Smithies et al. | 382/119 |
| 5,703,952 A * | 12/1997 | Taylor | 380/44 |
| 5,757,919 A | 5/1998 | Herbert et al. | 380/25 |
| 5,778,316 A | 7/1998 | Persson et al. | 455/434 |
| 5,809,230 A | 9/1998 | Pereira | 395/186 |
| 5,825,878 A | 10/1998 | Takahashi et al. | 380/4 |
| 5,841,868 A | 11/1998 | Helbig, Sr. | 380/25 |
| 5,870,742 A * | 2/1999 | Chang et al. | 707/8 |
| 5,893,921 A | 4/1999 | Bucher et al. | 711/146 |
| 5,912,453 A | 6/1999 | Gungl et al. | 235/492 |
| 5,918,007 A | 6/1999 | Blackledge, Jr. et al. | 395/186 |
| 5,935,247 A | 8/1999 | Pai et al. | 713/200 |
| 5,940,513 A | 8/1999 | Aucsmith et al. | 380/25 |
| 5,987,572 A * | 11/1999 | Weidner et al. | 711/155 |
| 6,021,476 A | 2/2000 | Segars | 711/163 |
| 6,023,510 A | 2/2000 | Epstein | 380/25 |
| 6,052,763 A * | 4/2000 | Maruyama | 711/152 |
| 6,101,543 A | 8/2000 | Alden et al. | 709/229 |
| 6,116,402 A | 9/2000 | Beach et al. | 194/216 |
| 6,148,387 A * | 11/2000 | Galasso et al. | 711/203 |
| 6,182,142 B1 | 1/2001 | Win et al. | 709/229 |
| 6,182,217 B1 | 1/2001 | Sedlak | 713/172 |
| 6,226,742 B1 | 5/2001 | Jakubowski et al. | 713/170 |
| 6,230,269 B1 | 5/2001 | Spies et al. | 713/182 |
| 6,275,982 B1 * | 8/2001 | Nassor | 717/168 |
| 6,311,255 B1 | 10/2001 | Sadana | 711/152 |
| 2002/0010679 A1* | 1/2002 | Felsher | 705/51 |

OTHER PUBLICATIONS

Foster et al., pending U.S. patent application entitled "Initializing, Maintaining, Updating And Recovering Secure Operation Within An Integrated System Employing A Data Access Control Function", U.S. Appl. No. 10/125,805, co-filed herewith, Published as US PG Pub., Oct. 23, 2003.

Evans et al., pending U.S. patent application entitled "Control Function Employing A Requesting Master ID And A Data Address To Qualify Data Access Within An Integrated System", U.S. Appl. No. 10/125,527, co-filed herewith, Published as US PG Pub., Oct. 23, 2003.

* cited by examiner

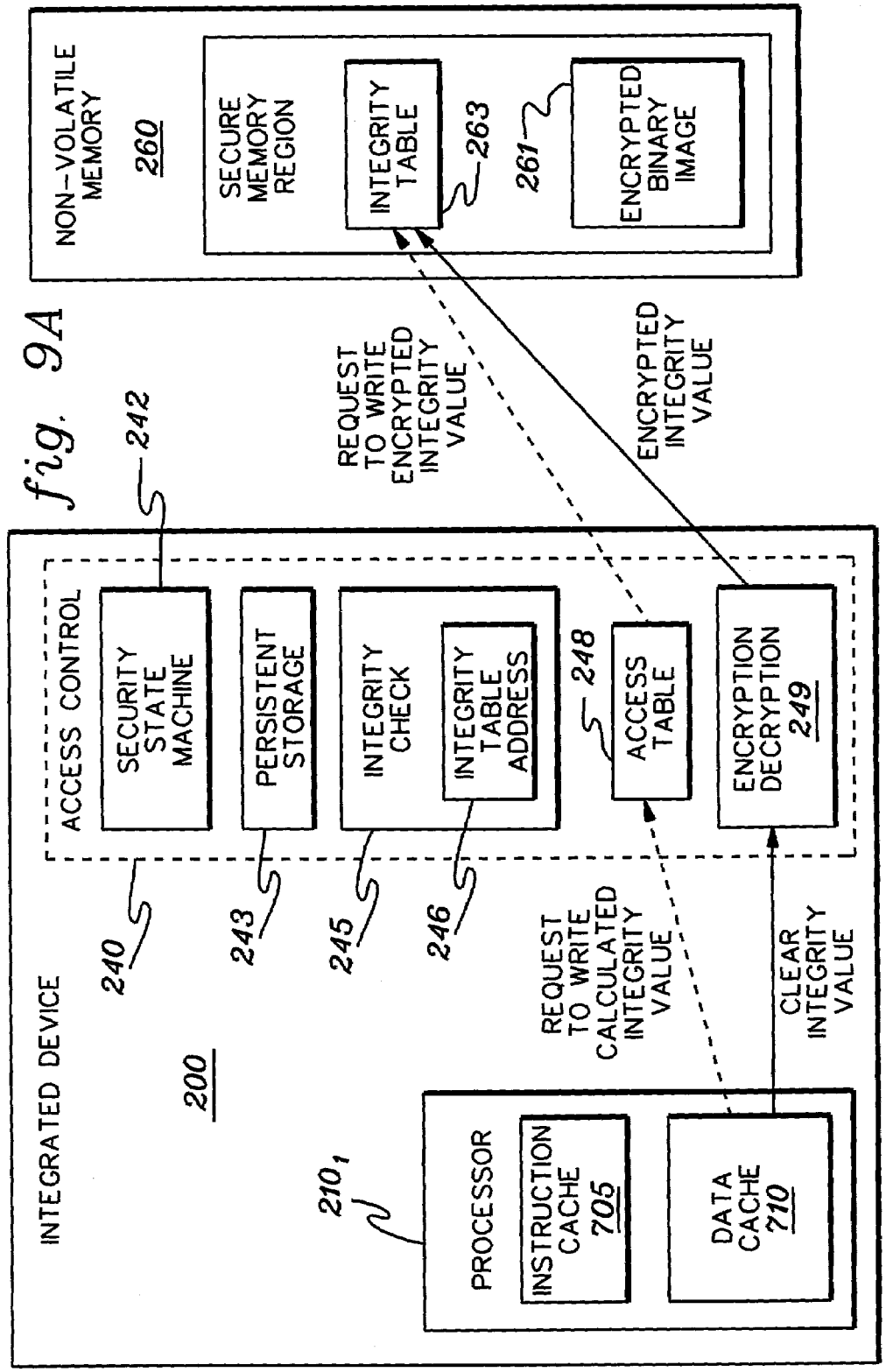

CONTROL FUNCTION IMPLEMENTING SELECTIVE TRANSPARENT DATA AUTHENTICATION WITHIN AN INTEGRATED SYSTEM

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"CONTROL FUNCTION EMPLOYING A REQUESTING MASTER ID AND A DATA ADDRESS TO QUALIFY DATA ACCESS WITHIN AN INTEGRATED SYSTEM", by Evans et al., U.S. Ser. No. 10/125,527, now U.S. Pat. No. 6,851,056 B2 issued Feb. 1, 2005; "CONTROL FUNCTION WITH MULTIPLE SECURITY STATES FOR FACILITATING SECURE OPERATION OF AN INTEGRATED SYSTEM", by Foster et al., U.S. Ser. No. 10/125, 115, now U.S. Pat. No. 7,089,419 B2 issued Aug. 8, 2006; and "INITIALIZING, MAINTAINING, UPDATING AND RECOVERING SECURE OPERATION WITHIN AN INTEGRATED SYSTEM EMPLOYING A DATA ACCESS CONTROL FUNCTION", by Foster et al., U.S. Ser. No. 10/125,803, now U.S. Pat. No. 6,715,085 B2 issued Mar. 30, 2004.

TECHNICAL FIELD

This invention relates generally to data request handling and transfer of data within an integrated system, and more particularly, to a data authentication technique, implemented by a data access control function of an integrated system, which is capable of authenticating requested data transparent to a requesting functional master of the system.

BACKGROUND OF THE INVENTION

Multiple master functions are today being commonly integrated onto a single system chip. When initially defining an architecture for the integration of multiple discrete components onto a single chip, access to external devices can be an issue. For example, an MPEG video decoder system often employs external memory for various data areas, or buffers such as frame buffers. This external memory is conventionally implemented using either DRAM or SDRAM technology.

Two approaches are typical in the art for accessing off-chip devices. In a first approach, each on-chip functional unit is given access to the needed external device(s) through a data bus dedicated to that particular unit. Although locally efficient for accessing the external device, globally within the integrated system this approach is less than optimal. For example, although each function will have complete access to its own external memory area, there is no shared access between functions of the integrated system. Thus, transferring data from one memory area to another memory area of the system is often needed. This obviously increases the number of data transfers and can degrade performance of the overall system, i.e., compared with a shared memory system.

Another approach is to employ a single common bus within the integrated system which allows one or more functional units of the system to communicate to external devices through a single port. Although allowing the sharing of devices, one difficulty with this approach concerns controlling access to content or other sensitive data in the integrated system. For example, when using a large common memory pool in an integrated design, it becomes difficult to prevent unauthorized access to protected memory spaces, such as compressed data supplied by a transport demultiplexer to a decoder of a set-top box. This is especially true for a system where the programming interface is open and outside development is encouraged. Each of the functional masters should be able to access the memory space and it is not possible to differentiate whether an access is from a trusted master or an outside request, e.g., coming through an untrusted or open master.

In addition, when working with a system-on-chip design with multiple functional masters using shared memory, it is desirable to provide a mechanism for protecting the data from unauthorized access, particularly when the data comprises the device's system programming code. Encryption can be used to protect code and data structures stored in a system, but the encrypted values could be modified, either intentionally or unintentionally, while the values are in unsecured or open storage. When an integrated system decrypts corrupted values, it will yield an incorrect result. While this prevents unauthorized control of the system, it can lead to operational problems since the incorrect result could be a random value and cause unwanted actions, such as machine checks, incorrect data, etc.

In view of the above, a need exists in the art for an enhanced access control approach for an integrated system. More particularly, a need exists for an access control function which includes a means of authenticating, or verifying, the integrity of code or data retrieved from storage.

SUMMARY OF THE INVENTION

The shortcomings of the prior art are overcome and additional advantages are provided through the provision of a method for authenticating data within an integrated device. The method includes: passing a data request from a functional master through a data access control function; and responsive to the data request, selectively authenticating the requested data at the data access control function transparent to the functional master of the integrated device initiating the data request.

In an enhanced embodiment, the selectively authenticating includes: obtaining a pre-determined first integrity value representative of the requested data; employing a data address associated with the data request to read encrypted, requested data responsive to the data request; decrypting, by the data address control function, the encrypted, requested data; calculating a second integrity value from the decrypted requested data; and comparing the first integrity value and the second integrity value to authenticate the requested data, and with authentication thereof, returning the requested data to the functional master initiating the data request.

In other aspects, the selectively authenticating of the data authentication method can include determining by the data access control function whether the data request requires integrity checking. This determining can be based on one or more of a master id of the functional master initiating the data request and an address of the data requested. Additionally, the selectively authenticating can include employing cascading integrity values, with the cascading integrity values including at least one composite integrity value maintained by the data access control function. The at least one composite integrity value, which is an integrity value derived from other integrity values, can be maintained in persistent storage associated with the data access control function.

Systems and computer program products corresponding to the above-summarized methods are also described and claimed herein.

Advantageously, the data authentication technique disclosed herein can be used to verify code and data before execution or use, thereby verifying requested data and avoiding undetected, unauthorized modifications thereof. This data authentication technique can be implemented in a data access control function of an integrated device, such as in the memory subsystem of the device, and can be transparent to the master functions of the integrated device. Normal development techniques can be used, with data authentication being added prior to shipment.

The authentication approach disclosed herein advantageously reuses the encryption/decryption engine of a data access control function such as described in the above-incorporated applications. More particularly, the encryption/decryption engine of the data access control function can be used to protect integrity values when stored, thereby allowing simplified integrity value calculations compared with other known algorithms. The data authentication technique presented herein can be employed to authenticate code or data on a block basis in small granularity (number of bytes), so code and data fetch latency can be minimized since only the small code block is transferred in order to calculate the integrity value. Additionally, the integrity value determination can be cascaded so that a small data block size can be used in a hierarchical manner to cover large memory spaces with a single root integrity value. The single root integrity value could be maintained in on-chip persistent storage associated with the data access control function.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9A depicts one embodiment of an alternate process for writing an encrypted integrity value to memory, in accordance with an aspect of the present invention;

BEST MODE FOR CARRYING OUT THE INVENTION

Figure 1:
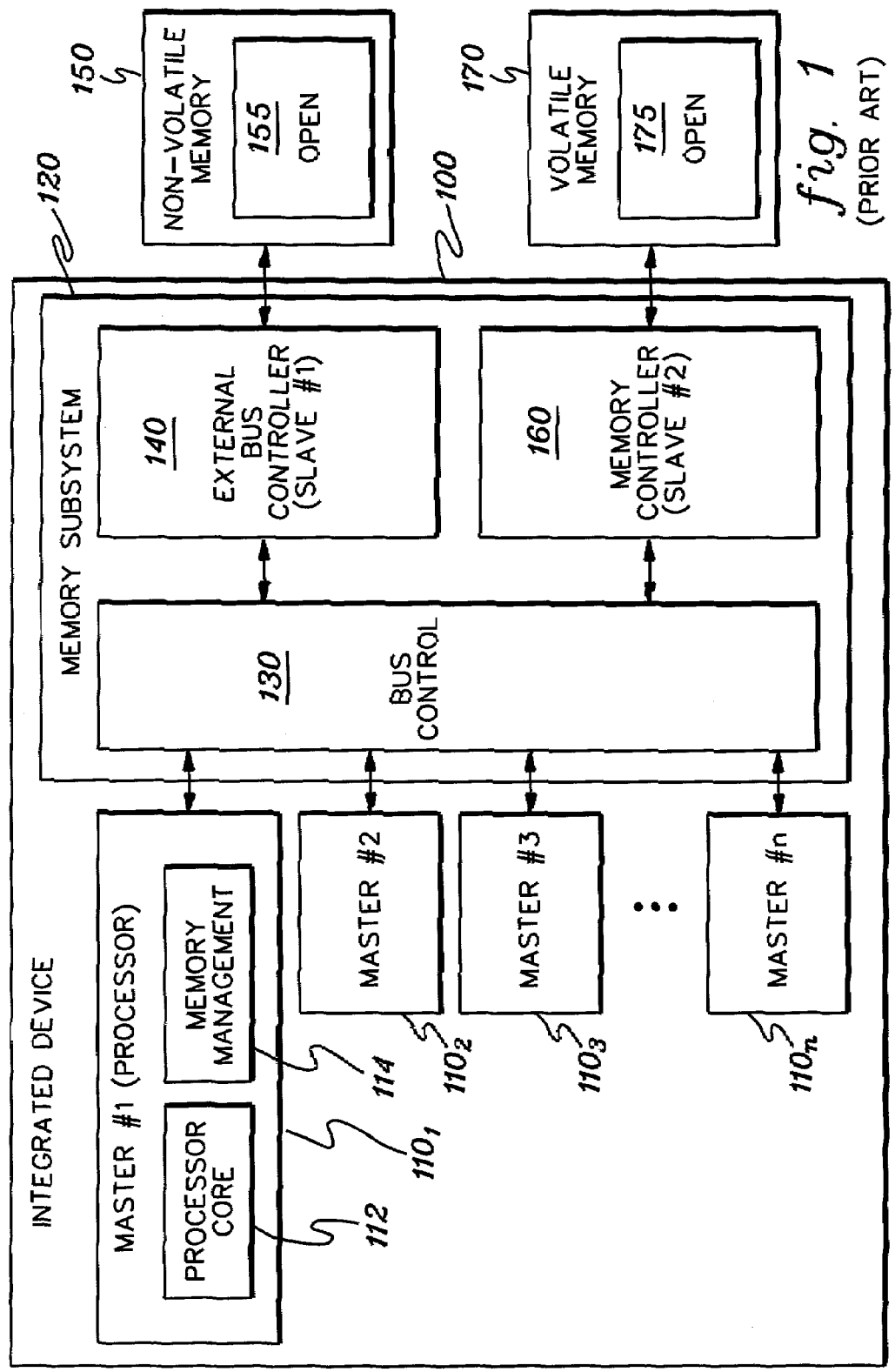
FIG. 1 depicts one example of a typical integrated device employing common memory access through a memory subsystem.

FIG. 1 depicts a conventional integrated device, generally denoted 100, having multiple internal functional masters $110_1$, $110_2$, $110_3$ ... $110_n$. Master $110_1$ is shown as a processor, having a processor core 112 and a memory management unit 114. Internal masters $110_1$, $110_2$, $110_3$ ... $110_n$ connect in this example to a memory subsystem 120, which includes bus control logic 130 of a shared bus. Those skilled in the art will understand that although shown within the memory subsystem, bus control 130 could alternatively reside outside of subsystem 120.

Bus control unit 130 coordinates and consolidates requests to slaves in the integrated device. For example, a first slave might comprise an external bus controller 140 which is connected to an external non-volatile memory 150, such as flash memory, having an open memory portion 155. A second slave, memory controller 160 connects to external volatile memory 170, such as SDRAM or DRAM. Memory 170 includes an open memory portion 175. In general, functions share a common memory pool in this integrated design in order to minimize memory costs, and to facilitate transfer of data between functions. As such, all internal masters have equal access to both non-volatile and volatile memory, and both storage spaces are labeled open, meaning that there are no limits on data access.

Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains application data as well as data structures of other masters. Since volatile memory is faster than non-volatile memory, it is common to move operating code to volatile memory and execute instructions from there when the integrated device is operational.

Note that in a typical system such as presented in FIG. 1, there are several security risks. Namely,
1. The behavior of the processor can be controlled by modifying the operating code or data structures, and internal data or operation can be compromised.
2. In certain cases, such as a communication controller, etc., an internal master can be controlled by an external source, and can be used to compromise internal code or data since memory is shared.
3. Debug and development tools that are used in software development can be used to modify or monitor the processor's behavior.
4. A given master can unintentionally corrupt or compromise the operation of another internal master since memory is shared.

The solution presented herein to the above-noted security risks involves providing an access control function disposed within the data path between the bus control and the slave devices. This access control function uses (in one embodiment) characteristics of the internal bus that connects the functional masters to the slave devices to allow each request for access to be further qualified based on a set of secure control information, and if desired, to be prevented. Advantageously, this access control function provides the ability to differentiate accesses by which master is making the data request, as well as where the data is stored, and then to either grant or limit access accordingly, or to otherwise qualify the access.

Figure 2:
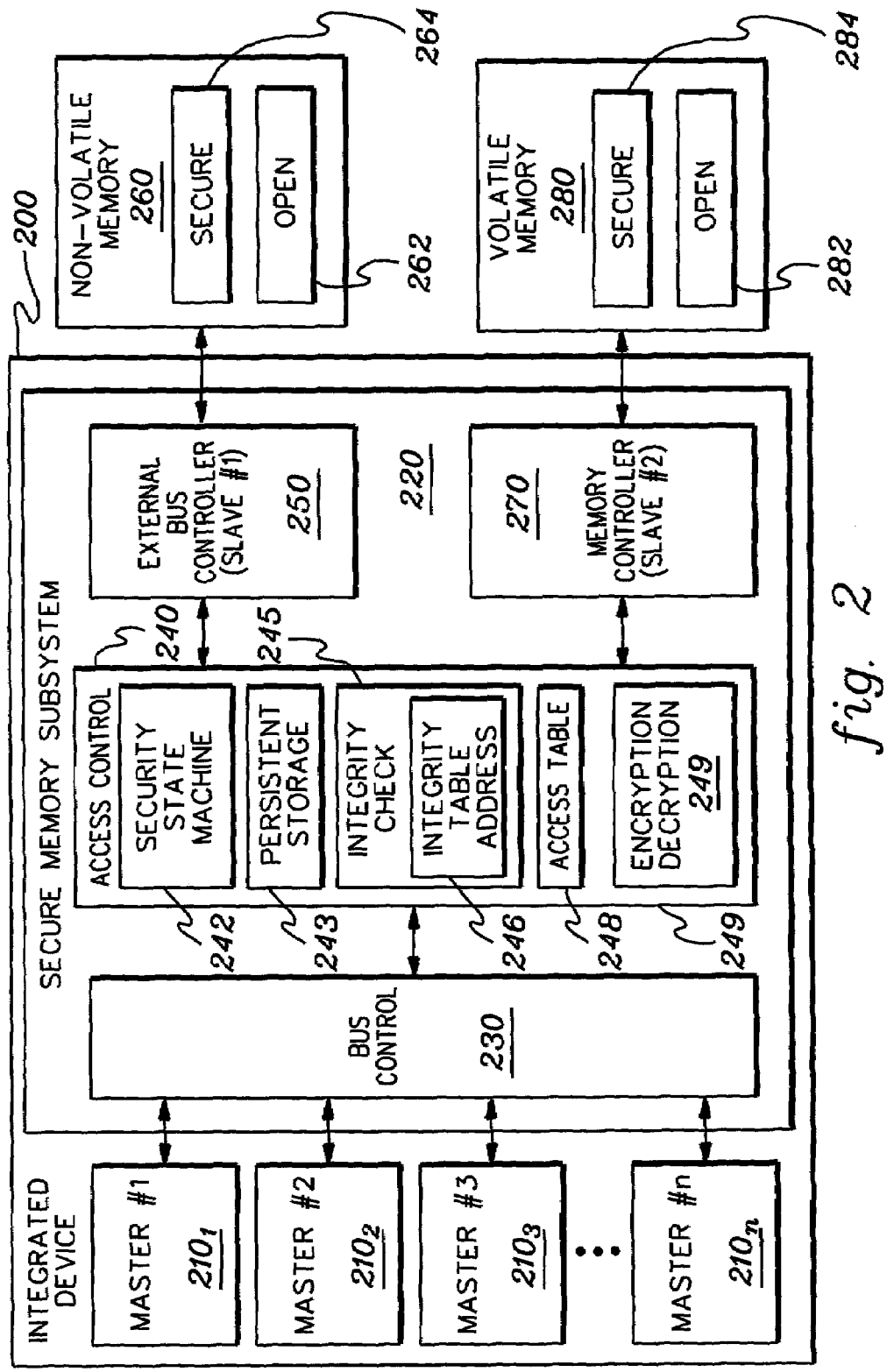
FIG. 2 depicts one embodiment of an access control function implemented within a secure memory subsystem of an integrated device, in accordance with an aspect of the present invention.

FIG. 2 illustrates one embodiment of a system, generally denoted 200, which includes an access control function 240 in accordance with an aspect of the present invention. System 200 again includes multiple functional masters $210_1$ ... $210_n$ which communicate via a bus control 230 with one or more slaves 250 & 270. In this case, access control function 240 intercedes in the data path between bus control 230 and slaves 250 & 270. As an alternate embodiment, bus control unit 230 could reside outside of the secure memory subsystem unit. As shown, a first slave device comprises an external bus controller 250, and a second slave device comprises a memory controller 270. In this context, the combination of the bus control unit, access control unit and external controllers form the secure memory subsystem 220. As a result, the external address space defined as non-volatile memory 260 and volatile memory 280 can be further divided into open area 262 and secure area 264, as well as open area 282 and secure area 284, respectively. In this use, "secure" implies that masters $210_1$ ... $210_n$ can only access a space as defined in the access control unit 240. Note that the access control function controls all accesses to both open and secure areas.

A detailed description of the access control function of unit 240 is included described in the above-incorporated application entitled "Control Function Employing A Requesting Master ID And A Data Address To Qualify Data Access Within An Integrated System". Further, the above-incorporated application describes in detail the use of an access table 248 and an encryption/decryption function 249 in qualifying requests for data based on an access level of the functional master requesting the data and the address of the data requested.

Briefly described, a request from a master granted control by the bus control unit is sent to the access control unit, along with the requested address and associated controls (e.g., read or write, etc.). The access table is used by the access control function to compare the requested address, master id, and read or write indicator to a definition of allowed access capability for that master. The given request can either be blocked (terminated), allowed in the clear, or allowed with encryption/decryption. If the requested transfer is allowable, then the bus signals are propagated to the slaves, and access parameters associated with the request based on the access table are sent to the encryption/decryption engine, i.e., if encryption/decryption is applicable. The encryption/decryption engine can be used to encrypt write data as the data is transferred to a given slave, or decrypt read data as the data is returned from a given slave using the associated access parameters.

In addition to the functions of qualifying data access based on the requesting master id and the address of the request, the concept of adding a security state machine 242 to the access control function to, for example, control operation of the access table 248 and encryption/decryption function 249 is described in the above-incorporated application entitled "Control Function With Multiple Security States For Facilitating Secure Operation Of An Integrated System". On-chip storage 243 is also used in conjunction with the security state machine 242 to hold a substitute boot address 245 and a master key set 246. This storage is persistent in that values are retained even when general power is removed. As a result, once initialized, these values can be used from session to session until specifically reset or erased with a change in security state as described hereinbelow.

The security state machine of the data access control function can be one state of multiple possible security states, including a null state and a secured state. In the secured state, the control function replaces a standard boot code address associated with the request for boot code with a substitute boot code address. The substitute boot code address addresses an encrypted version of boot code, which is then decrypted by the control function employing a master key set held in the persistent storage. When in the null state, the master key set is erased.

As a further enhancement of the above-described data access control function, presented herein is the concept of adding a control capability to selectively authenticate requested data. This selective authentication can be transparent to the functional master of the integrated device initiating the data request. The requested data can either comprise code or data that is stored in encrypted form in external memory. (Note that "data" is generically used herein in places, including the claims, to refer to code or data.) While the encryption capabilities of the above-described data access control function prevent direct observation and modification of data, the integrity check function described hereinbelow adds the ability to further verify that the encrypted value is the same value that was written to memory originally.

In one embodiment, an integrity check function in accordance with an aspect of the present invention works in conjunction with the access table and access parameters described in the above-incorporated applications. Address ranges that are to be associated with authenticated data can be indicated by an additional parameter in the access table. The integrity check function determines the location of integrity values in memory based on the requested data transfer, and also calculates and compares the integrity values as described below.

Figure 3:
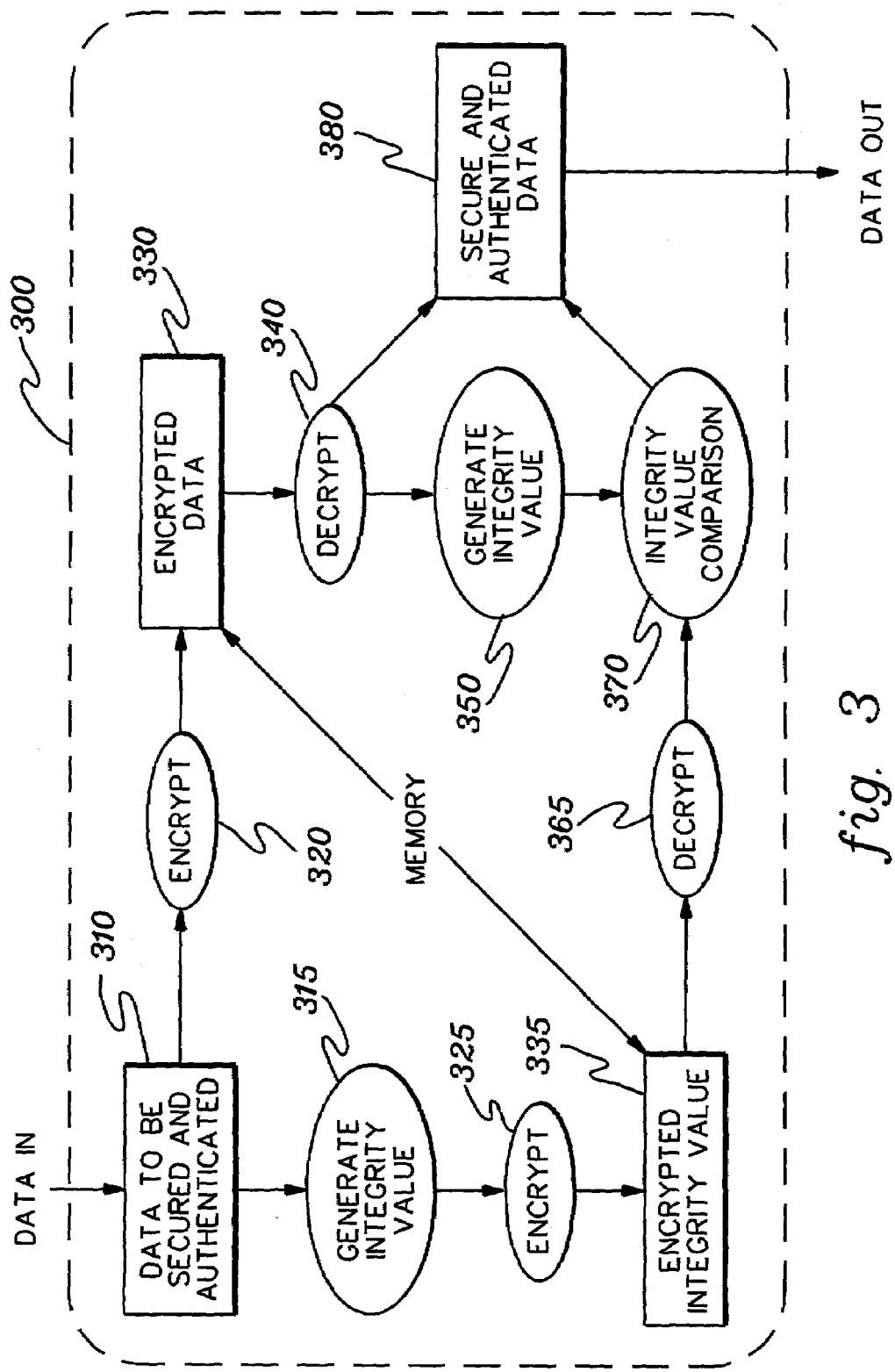
FIG. 3 depicts one embodiment of a data protection and authentication technique, in accordance with an aspect of the present invention.

FIG. 3 depicts one embodiment of processing employed for data authentication in accordance with an aspect of the present invention. Briefly summarized, the processes can be divided into pre-storage and post-storage steps, for example:

Pre-Storage
Generate a first integrity check value which is a mathematically condensed version of the data to be secured and authenticated.
Encrypt the data and encrypt the first integrity check value.
Store the encrypted integrity value and store the encrypted data in memory.

Post-Storage
Retrieve and decrypt the integrity value, and retrieve and decrypt the encrypted data from memory.
Generate a second integrity check value using the same function as employed in generating the first integrity check value.
Compare the first and second integrity check values. If they match, the data is authenticated. Otherwise, the data has been corrupted and corrective action should be taken.

As shown in FIG. 3, this data encryption and authentication process begins with receipt of data to be secured and authenticated 310. The processing is divided into two paths. On a first path, an encryption process 320 such as described in the above-incorporated applications is employed and the encrypted data 330 is sent to memory. Since the data has been encrypted, the data is not directly observable or modifiable by an outside party and is considered secure.

On a second processing path, a mathematical operation is applied to the received data to yield an integrity value or digest that is a reduced version of the data. For example, an 8:1 reduction of the data size may be employed. After generation of the integrity value 315, the value is encrypted 325 using the same technique as applied to the data since this function already exists in the overall device, and the resultant encrypted integrity value 335 is sent to memory. Since the encrypted integrity value is also considered secure, the mathematical operation used in the integrity check function can be simple. This mathematical operation favorably compares with the more complex algorithms used for similar purposes in the industry today, such as MD-5 and SHA-1.

To read and authenticate the secured data in memory, the above-described processes are reversed. Specifically, the encrypted data 330 is retrieved and decrypted 340 as described in the above-incorporated applications. Similarly, the encrypted integrity value 335 is retrieved and decrypted 365. Using the same mathematical operation as employed in initially generating the integrity value 315, a second integrity value is generated 350 from the decrypted data. The first and second integrity values are then compared 370, and if the two are identical, the data is considered authenticated 380 and is output.

Advantageously, the data authentication technique presented herein provides a means for, for example, a memory subsystem to generate the additional memory request for an integrity value, as well as process the data to provide the authentication. This processing can be implemented transparent to the requesting functional master of the integrated system.

Figure 4:
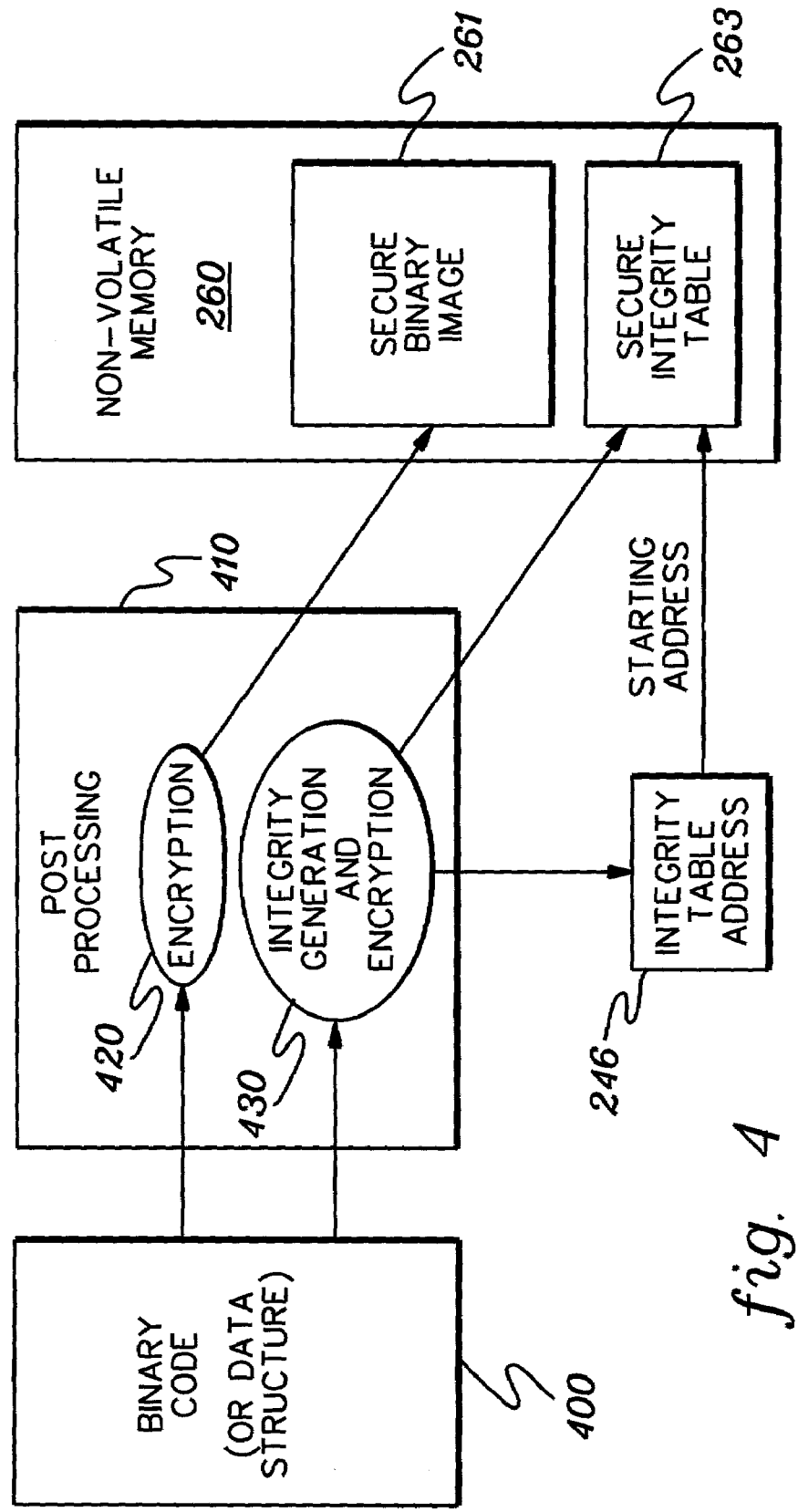
FIG. 4 depicts one example of a process for creating integrity values during code development for a data protection and authentication approach, in accordance with an aspect of the present invention.

FIG. 4 illustrates how authentication of code or data can be implemented with existing software development techniques. As part of the normal development process, a binary code or data structure (or image) 400 is created, for example, as the output of a compiler. A post-processing tool 410 would then be used to encrypt the binary image 420 with a key value that corresponds to that used by the device which it is intended. In addition, the integrity values for each block within the image are generated and encrypted 430. As an example, an 8 byte integrity value can be generated for 64 bytes of data, yielding a table of integrity values that is one-eighth the size of the original image. This table is then encrypted, again using the key value that corresponds to the intended device.

Both the encrypted binary image 261 and the encrypted integrity table 263 are loaded into, for example, non-volatile memory 260 for subsequent use with the target device. The starting address 246 of the integrity table is stored as a system initialization parameter. This table address 246 will be used to define where in memory the integrity check function should go to retrieve a required, encrypted integrity value. The integrity table address could be in non-volatile memory such as flash, or on a hard drive, or even within a network. Also, it is possible that the secure binary image and integrity table can be moved to a secure region in volatile memory as part of an initialization process in order to increase performance. Note that in practice, there may be more than one binary structure requiring authentication, and so there may be more than one integrity table, and more than one integrity table address value. It is possible to include support for multiple segments such as this in the secure memory subsystem.

Figure 5A:
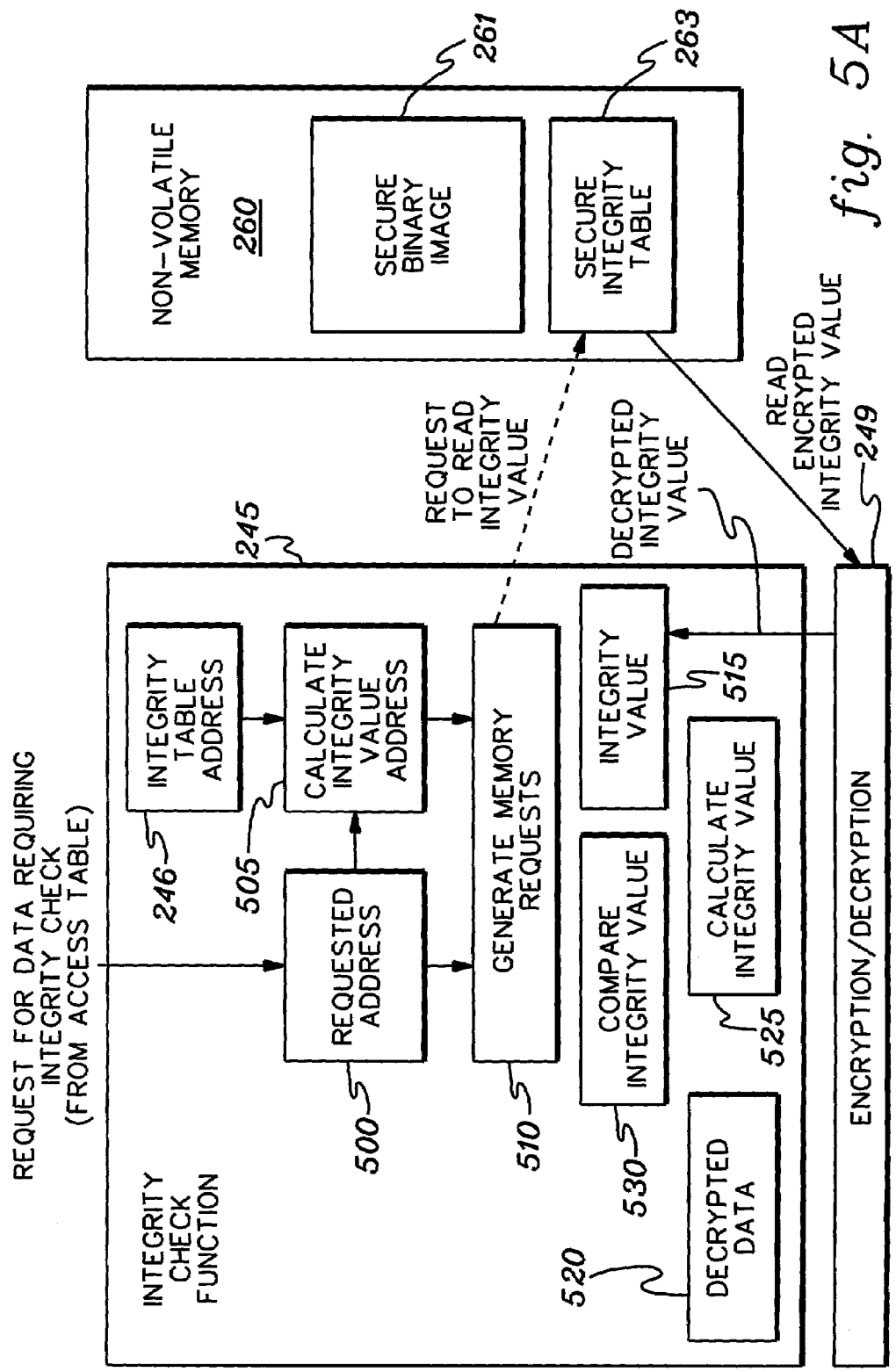
FIG. 5A depicts one example of a process for reading and decrypting an encrypted integrity value responsive to receipt of a data request requiring integrity checking, in accordance with an aspect of the present invention.
Figure 5B:
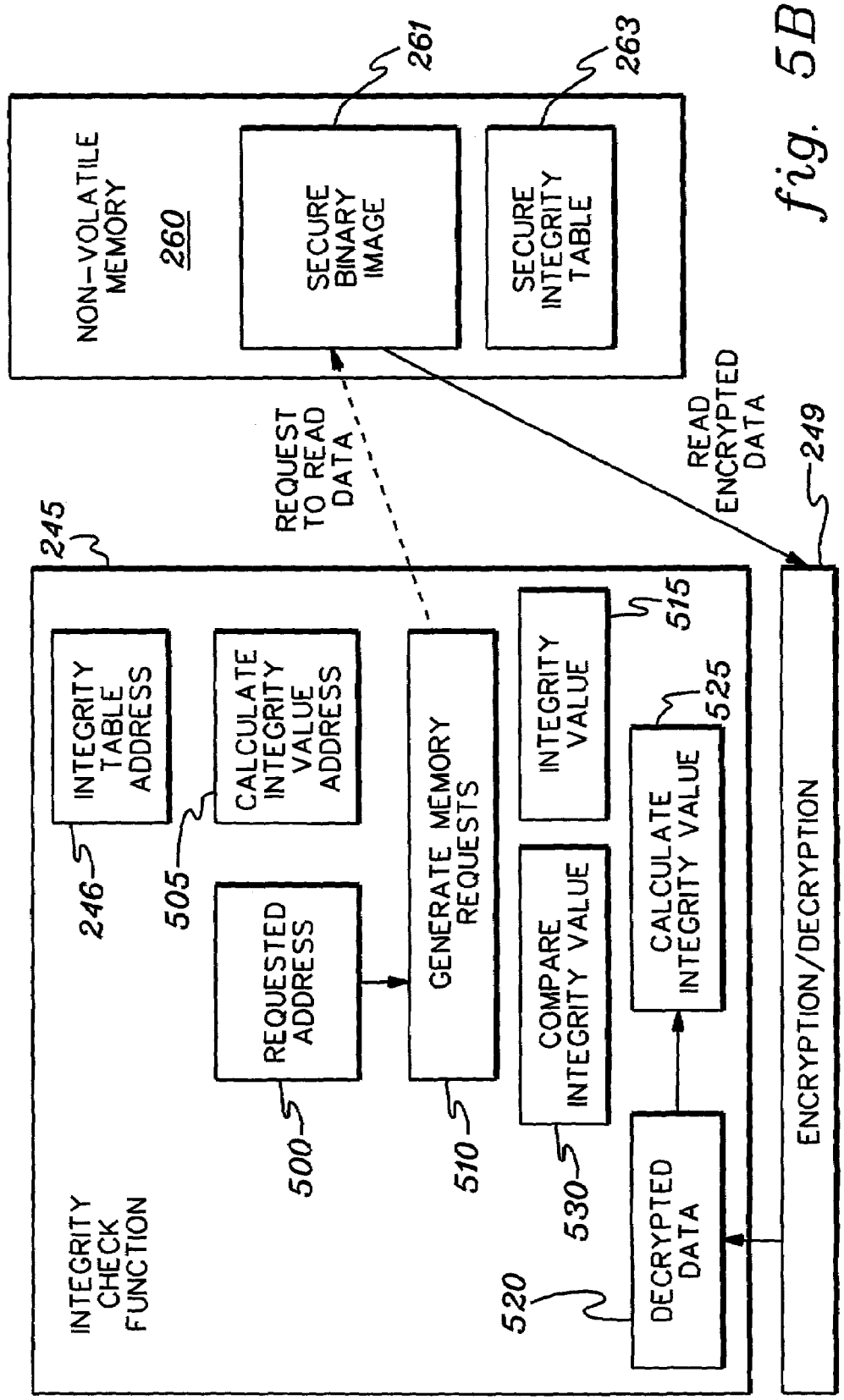
FIG. 5B depicts one example of a process for reading and decrypting data in accordance with the data request of FIG. 5A, and calculating therefrom a second integrity value, in accordance with an aspect of the present invention.
Figure 5C:
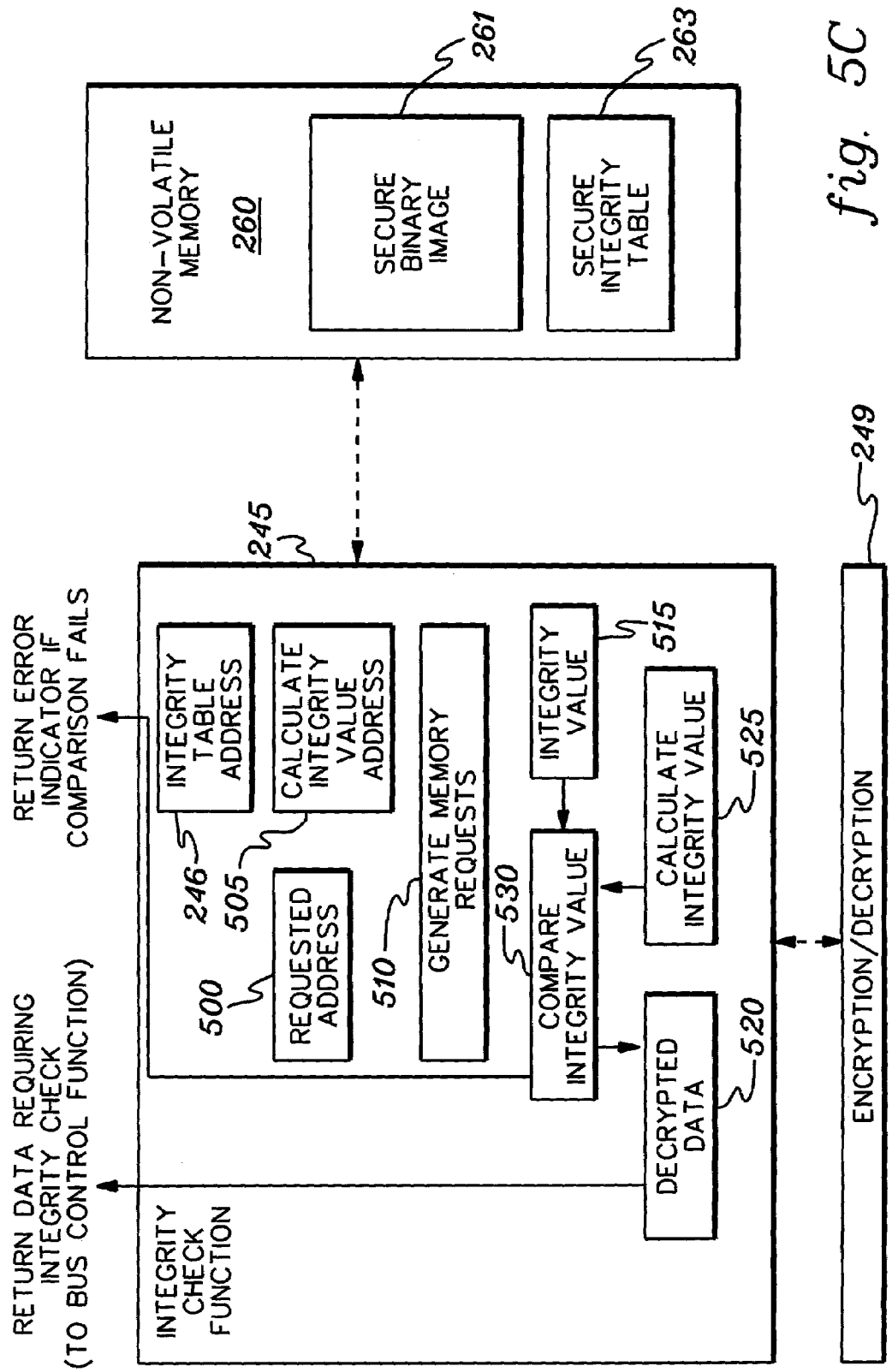
FIG. 5C depicts a process for comparing the first integrity value of FIG. 5A and the second integrity value of FIG. 5B as a means of establishing authentication of the requested data prior to forwarding thereof to the requesting functional master, in accordance with an aspect of the present invention.

FIGS. 5A-5C illustrate the internal operation of an integrity check function for a read operation, in accordance with an aspect of the present invention. As shown in FIG. 5A, a request to read authenticated data from external memory is passed to the integrity check function 245 of the access control function such as depicted in FIG. 2. Note that although shown as non-volatile memory in the figures, the authenticated data could alternatively reside in any external storage device, such as volatile memory, fixed storage, etc. This request includes an address 500 of the requested data, which can be compared to the overall size of the address range defined in the access table as described in the above-incorporated applications. Through comparison of the requested address to the start of the associated address range, the number of data blocks can be determined. For example, data blocks may be defined as 64 bytes, and the requested address may be defined as an offset of 640 from the base address, and so it would be the eleventh data block (i.e., the first block is at an offset of zero, and so on).

The relative location of the data block corresponds to the location of the integrity value in the integrity table. Specifically, the starting address 246 of the integrity table 263 is included in the integrity check function 245 as part of the access parameters associated with a given address range. Using the starting point and the relative entry for the requested address, the integrity check function 245 calculates the address in external memory associated with the appropriate integrity value and generates an external read request 510 for the integrity value. Note that this external request originates with the integrity check function directly and is not part of the original request for data.

The read encrypted integrity value is returned from external memory 260 and decrypted using the encryption/decryption function 249 of the data access control function (e.g., of FIG. 2). The decrypted integrity value 515 is stored temporarily in the integrity check function 245.

In FIG. 5B, the original read request is sent to external memory to retrieve the encrypted data (i.e., binary image) 261. The encryption/decryption function 249 of the data access control function is again used to decrypt the data 520, and an integrity value is calculated 525 for the resulting data block. Note that the order of the data and integrity value read operations to external memory could be reversed. Further, note that the integrity value generation algorithm employed in calculating the integrity value from the decrypted data should be the same algorithm as originally used to generate the encrypted integrity value retrieved from the secure integrity table 263 in FIG. 5A.

As shown in FIG. 5C, the integrity value retrieved from external memory 515 and the integrity value calculated 525 from the retrieved data are compared 530. If the integrity values match, then the data 520 is considered authenticated and is returned to the requesting master. If the integrity values do not match, then the integrity check function may return an error indicator which can be used to abort the transfer. Further, the error indicator could be used as part of a tamper detection function such as described in the above-incorporated application entitled "Control Function With Multiple Security States For Facilitating Secure Operation Of An Integrated System".

Figure 6A:
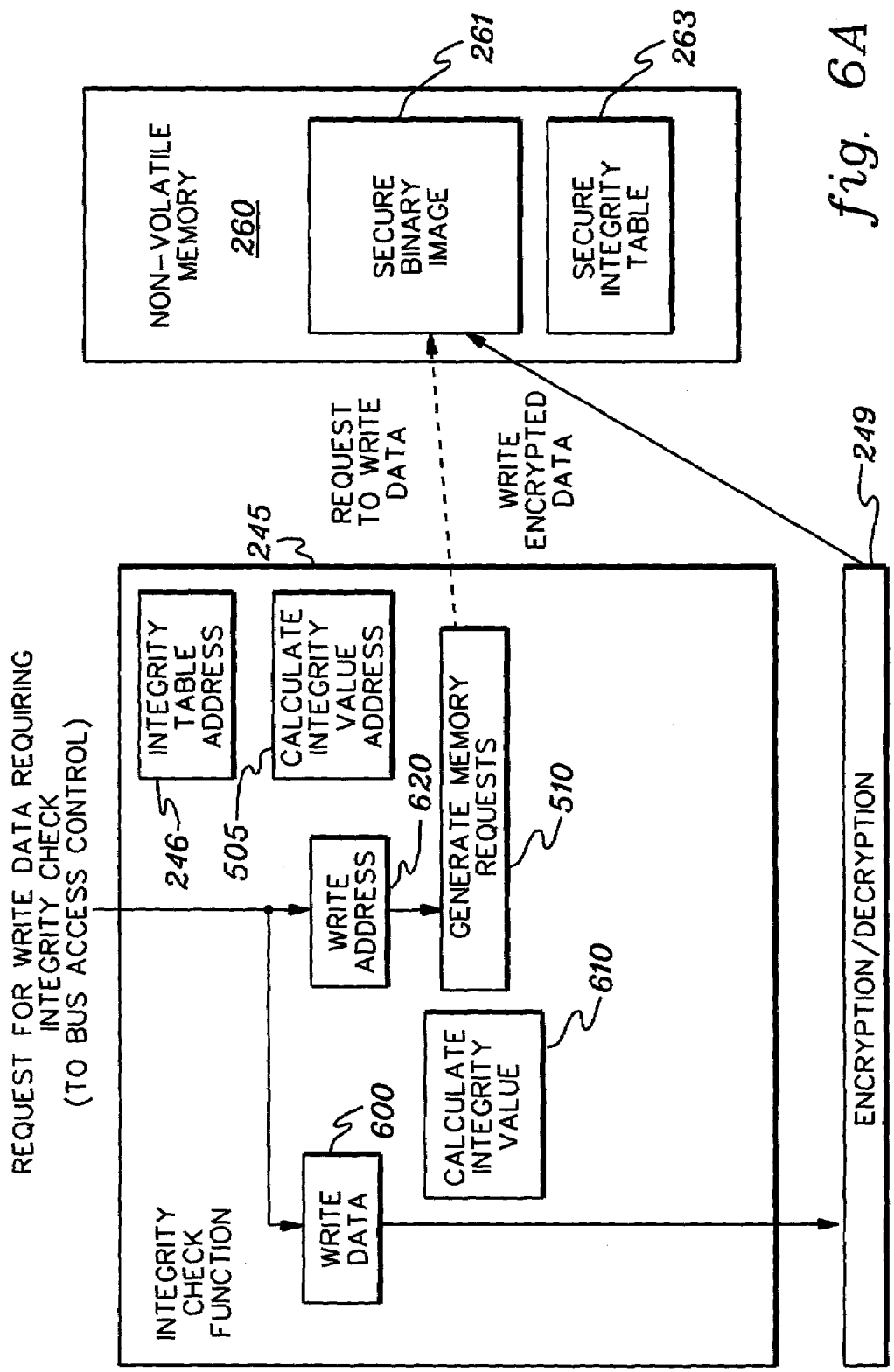
FIG. 6A depicts one embodiment of a process for writing data to memory requiring an integrity check, in accordance with an aspect of the present invention.
Figure 6B:
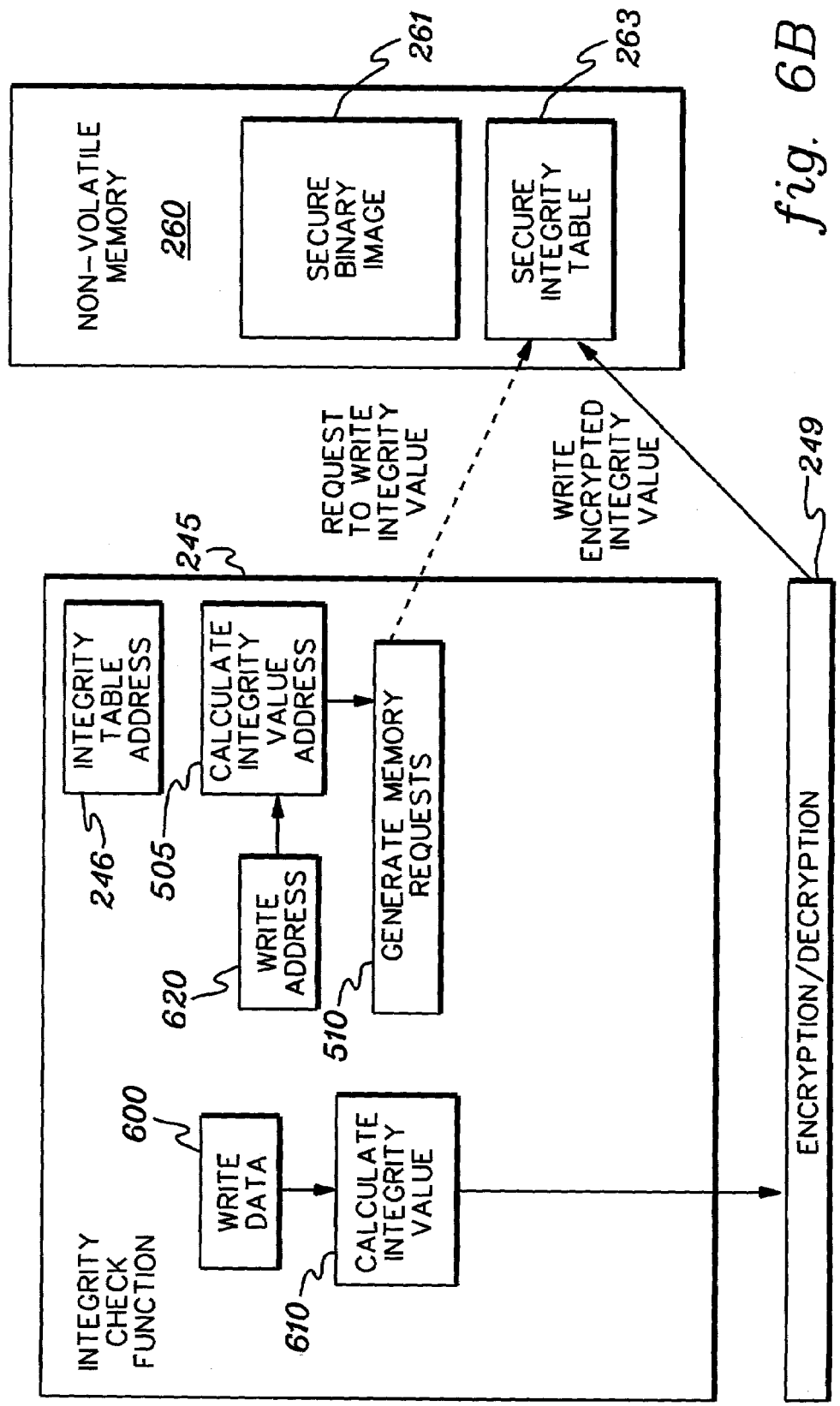
FIG. 6B depicts one embodiment of a process for writing an encrypted integrity value to memory associated with the written encrypted data of FIG. 6A, in accordance with an aspect of the present invention.

FIGS. 6A & 6B illustrate the internal operation of an integrity check function during a write operation, in accordance with an aspect of the present invention. As shown in FIG. 6A, a request to write authenticated data to external memory is passed to the integrity check function 245 within the data access control function such as depicted in FIG. 2. Since the write data 600 is readily available, the request to write can be immediately generated 510 using the write address 620 associated with the write data 600. The request to write is forwarded to non-volatile memory 260 along with the write data 600 which has undergone data encryption 249 prior to being written as a secure binary image 261 in memory.

FIG. 6B illustrates the steps for writing an encrypted integrity value associated with the encrypted write data. Again, the write request includes the write data 600 and the write address 620 for the requested data. As with the read operation, the write address can be compared to the overall size of the address range and the starting address 246 for the integrity table 263 to arrive at the address in external memory where the integrity value should be written. At the same time, the integrity value is calculated 610 for the write data, and then encrypted using the encryption/decryption function 249. A memory write request is generated 510 to write the encrypted integrity value to external memory and complete the operation. Note that the entire write transaction cannot be considered complete until the encrypted integrity value has been written to the secure integrity table.

Figure 7:
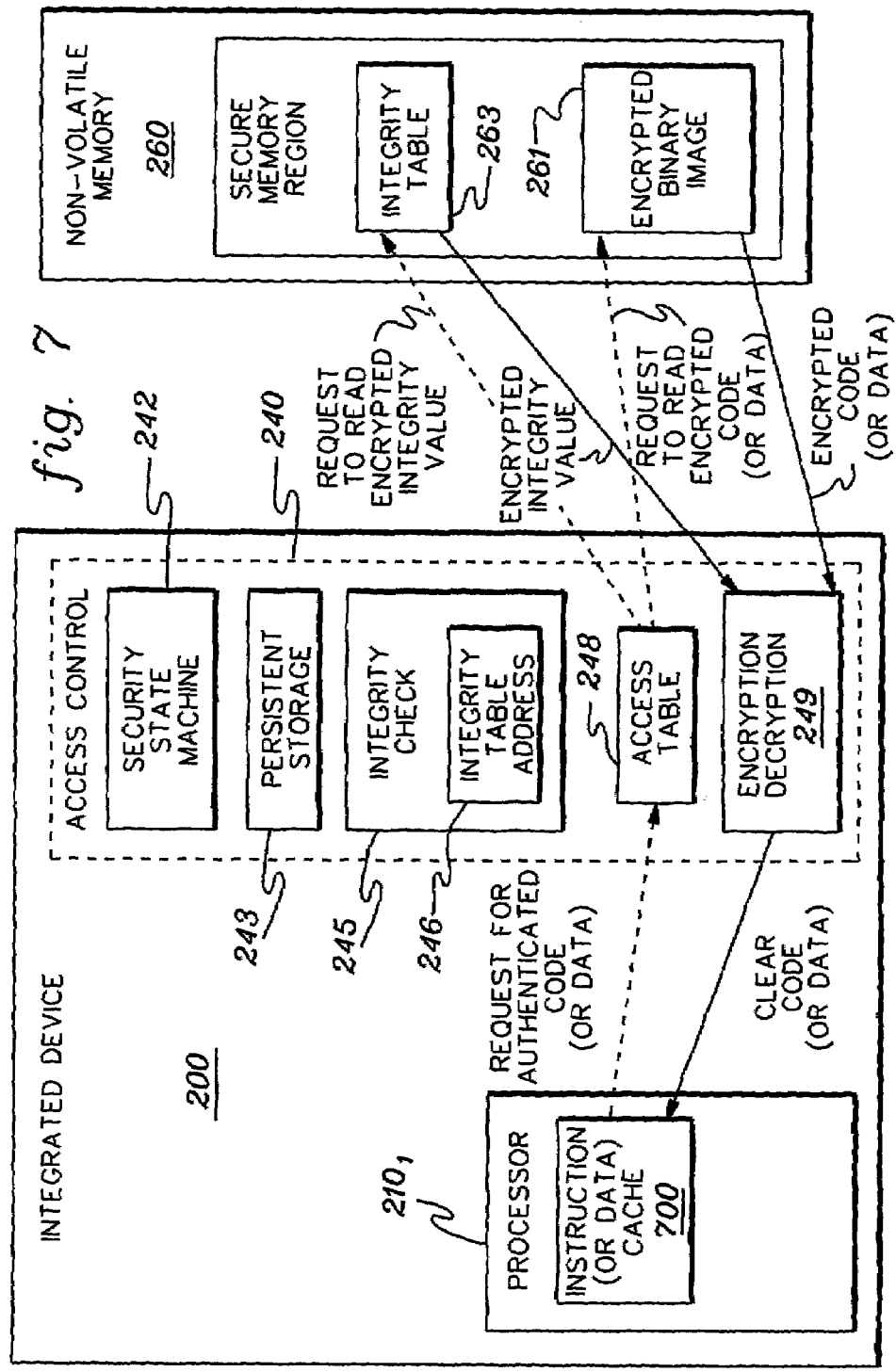
FIG. 7 depicts one embodiment of a process for reading and authenticating encrypted code or data, in accordance with an aspect of the present invention.

FIG. 7 illustrates one embodiment for reading authenticated data from external memory in the context of the overall integrated system such as depicted in FIG. 2, and relates to the detailed description of the integrity check function illustrated in FIGS. 5A-5C. (Note that FIG. 7 and certain subsequent figures are a simplified depiction of the integrated system of FIG. 2, wherein the bus control and slave elements are omitted for clarity.) A processor 210$_1$ (i.e., the requesting functional master) issues a request to read data from an external memory location. This request is forwarded to the data access control function 240 and is processed using the access table 248 to identify the associated address range, and also the access parameters, including an indicator that this request is for data to be authenticated.

The integrity check function 245 generates a new request for the appropriate integrity value in external memory 260, and retrieves this encrypted integrity value from the integrity table 263. In addition, the original read request is sent to external memory 260, and the encrypted data 261 is retrieved. The integrity check function then calculates and compares the integrity values as described above, and based on a match, returns the decrypted data to an instruction or data cache 700 associated with processor 210$_1$.

Figure 8:
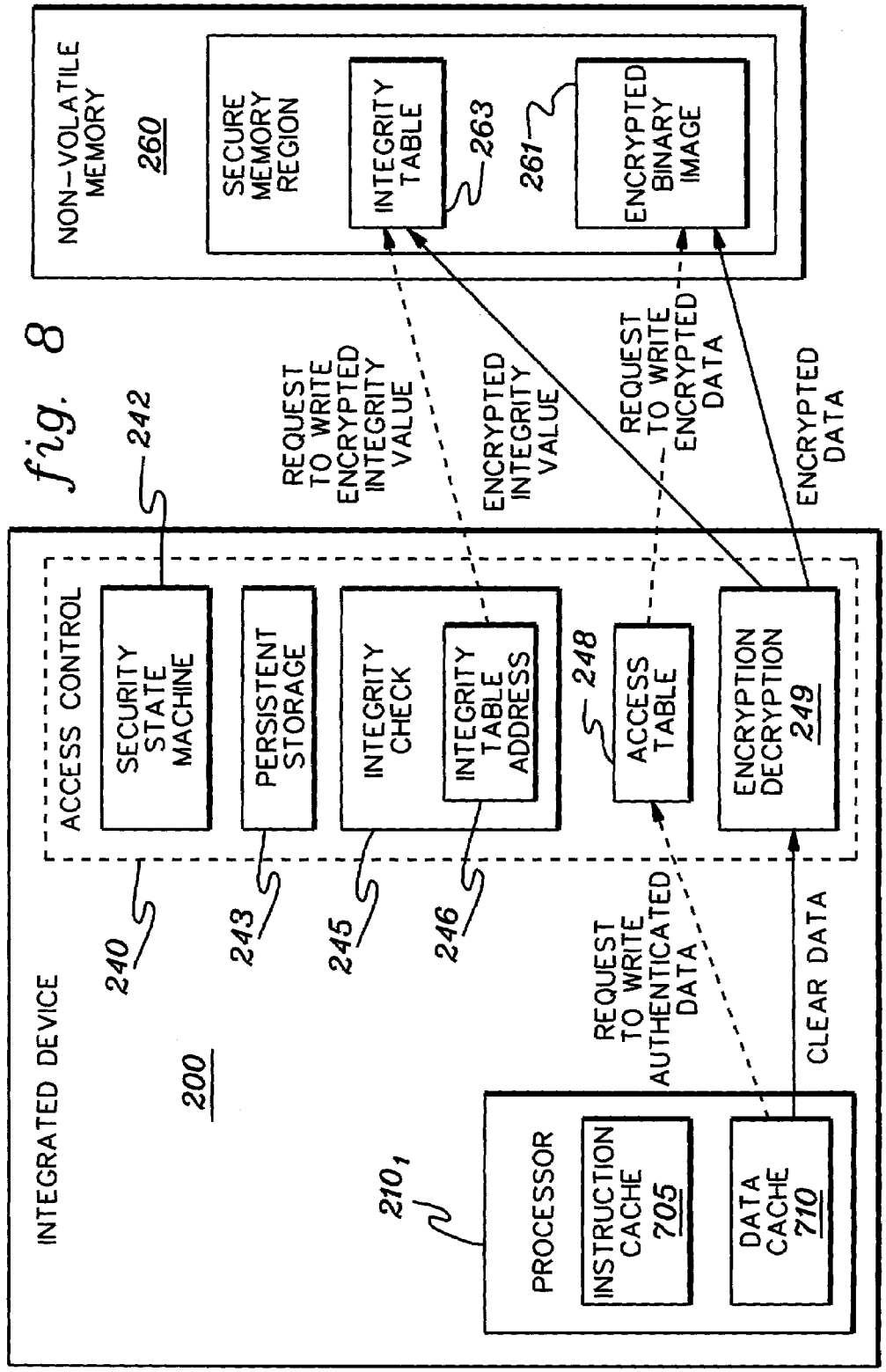
FIG. 8 depicts one embodiment of a process for transparently generating encrypted integrity values for data to be subsequently authenticated, in accordance with an aspect of the present invention.

FIG. 8 depicts the steps for writing authenticated data to external memory in the context of an overall integrated system which includes an integrated device 200 and non-volatile memory 260. This writing of authenticated data relates to the description above of the integrity check function shown in FIGS. 6A & 6B. A processor 210$_1$ issues a request to write data to an external memory location. The request is forwarded to the access control function 240 of the integrated device and is processed using the access table 248, which identifies the associated address range and also the access parameters, including an indicator that this request is for data that will need to be authenticated when read.

The original write request is then sent to external memory 260, and the write data is encrypted 249 and stored as an encrypted binary image 261. In addition, the integrity check function 245 generates a new request to write the generated integrity value, which is also encrypted 249 prior to being stored in the integrity table 263.

Figure 9B:
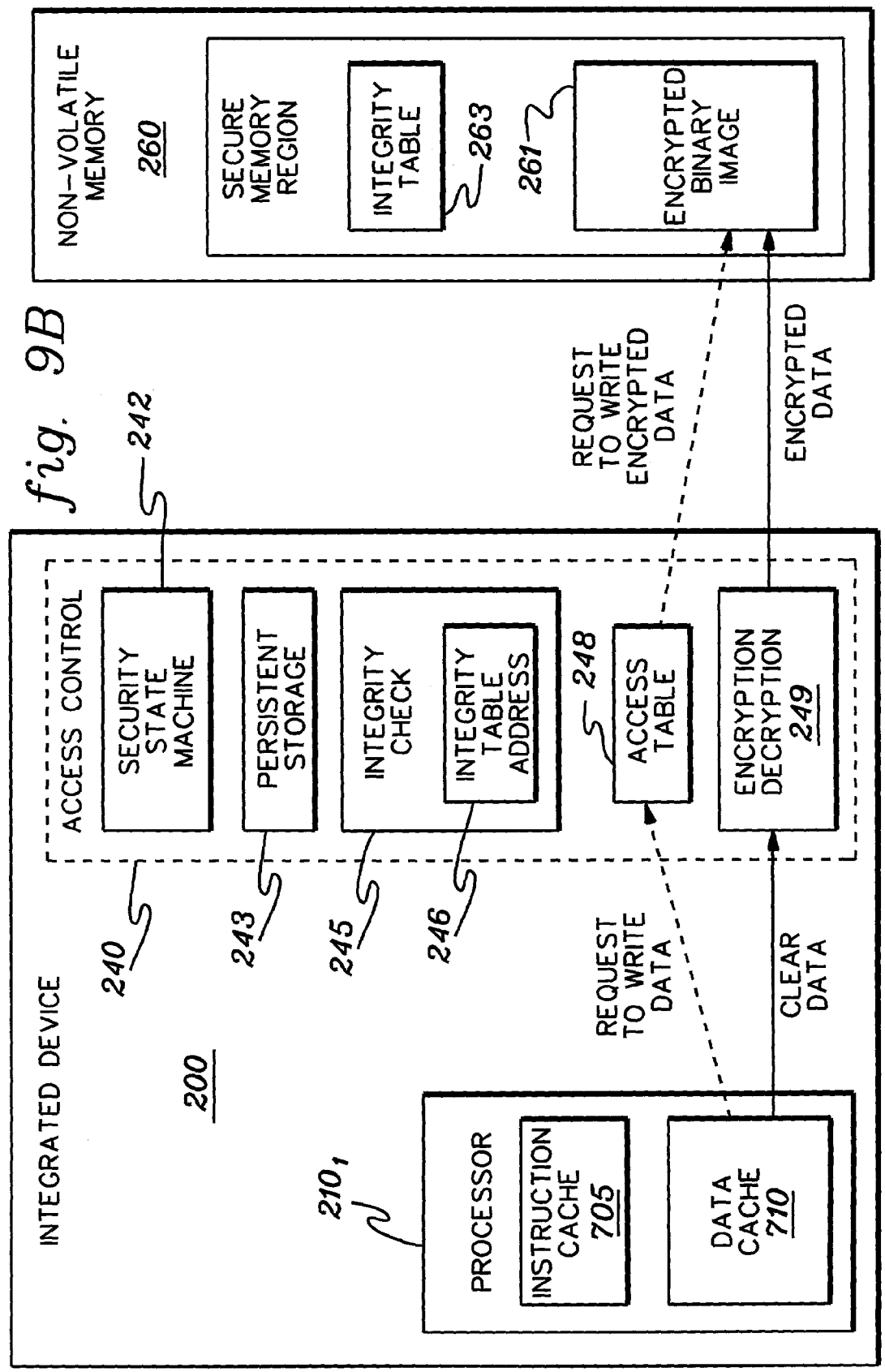
FIG. 9B depicts one embodiment of an alternate process for writing encrypted data to memory associated with the encrypted integrity value of FIG. 9A, in accordance with an aspect of the present invention.

FIGS. 9A & 9B illustrate an alternative approach to writing authenticated data and integrity values to memory. In this approach, the address range associated with the write request is not marked for authentication but only encryption. As shown in FIG. 9A, a processor 210$_1$ calculates the integrity value internally and explicitly writes the integrity value to the defined address range. As before, the integrity value undergoes encryption by the data access control function prior to being stored to memory 260 in integrity table 263.

As shown in FIG. 9B, the data from data cache 710 of processor 210$_1$ can undergo encryption 249 as the data is being written to the secure memory region of non-volatile memory 260 as an encrypted binary image 261. The encrypted data and encrypted integrity value in external memory can be identical to those that would be stored if the alternative transparent access control function processes described above were used. The stored integrity value and encrypted binary image can be authenticated when read using the processes depicted in FIG. 7. This approach can also be used to limit the hardware requirements on the integrity check function if it is desirable for a given integrated device design.

Figure 10:
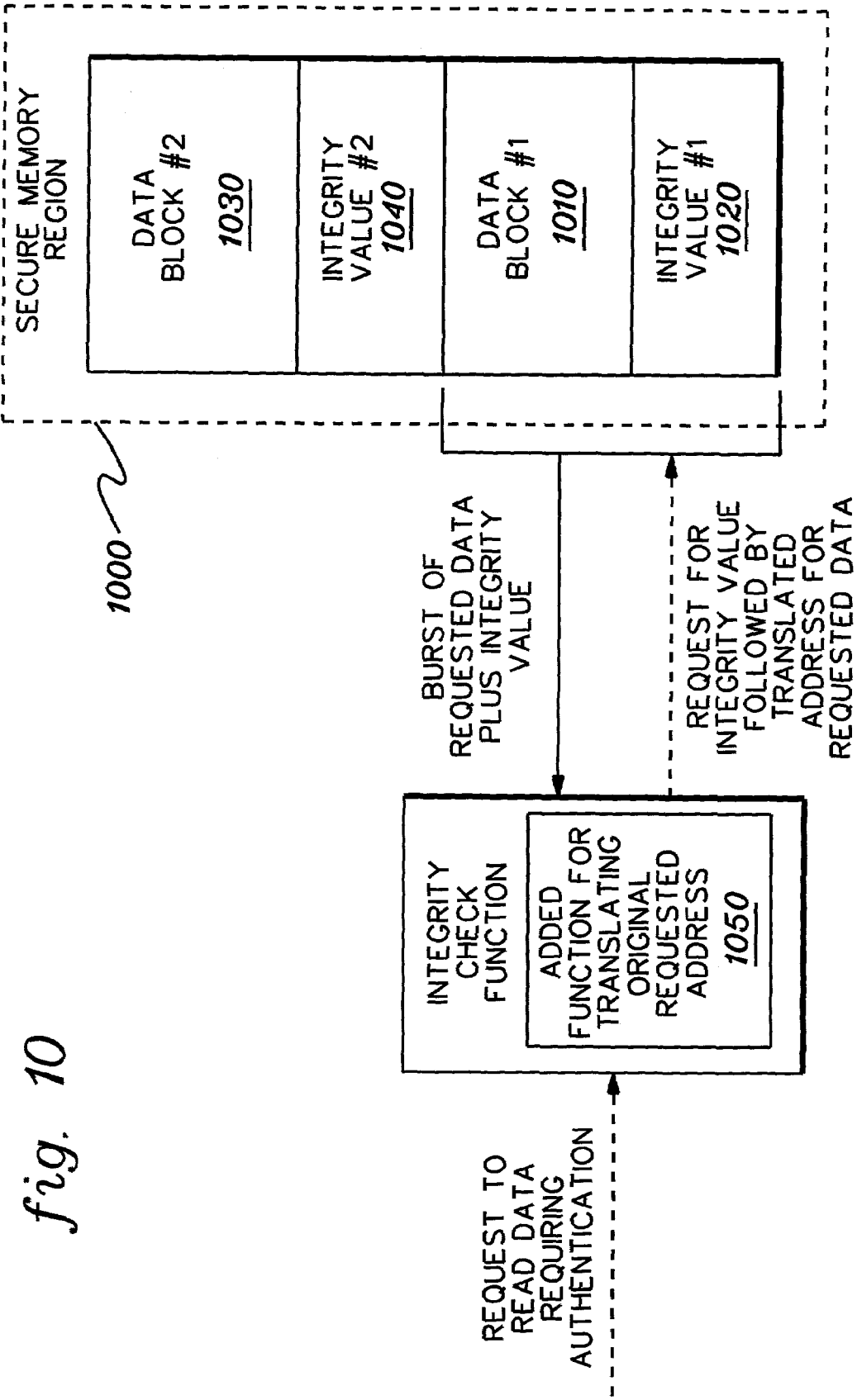
FIG. 10 depicts one embodiment of an alternate structure for storage of data and associated integrity values, in accordance with an aspect of the present invention.

FIG. 10 illustrates an alternative approach to storing integrity values in memory in order to improve the efficiency of transferring data to and from external memory. Data transfers to and from typical SDRAMs are very efficient when done in bursts where many consecutive bytes are transferred after an initial setup. The transfers are less efficient when changing the transfer location between multiple, non-consecutive addresses.

When the integrity table is located as a separate data structure in memory as shown in the preceding figures, each read or write request requires transferring data to two different address locations in memory, which can lead to additional latency time for the initial setup. An alternative operation would result from appending the integrity value and data transfer operations so that they are from consecutive memory addresses, thereby reducing the latency for a given operation. However, this also requires a change to the integrity check function.

More particularly, rather than calculating the integrity value address as described above, the integrity check function would translate the original memory request into an offset that includes the additional addresses needed to contain the inter-digitated integrity values. For example, a write request to an offset of three data blocks would need to be translated into an offset of three data blocks and three integrity values. The address for the integrity value is a natural consequence of this translation though, and no other address calculation is required.

In FIG. 10, secure memory region 1000 is shown to contain a first data block 1 1010, and an associated integrity value 1020, as well as a second data block 2 1030, and its associated integrity value 1040. The translated address for an integrity value followed by the requested data can be provided by an address translation function 1050 as described above. A burst of requested data plus integrity value can thus be returned when data is read.

Figure 11:
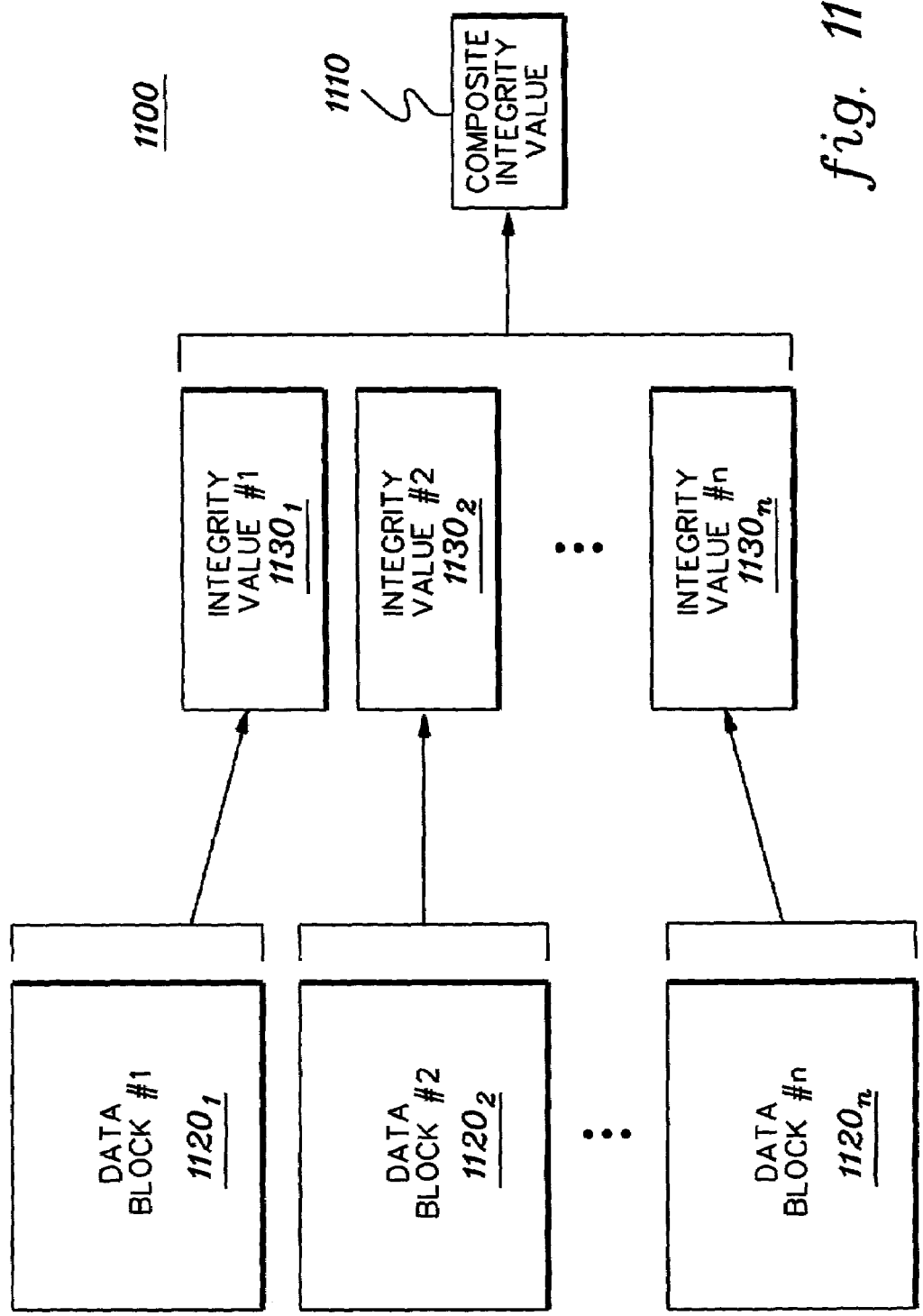
FIG. 11 depicts one embodiment of cascading integrity values for facilitating data authentication, in accordance with an aspect of the present invention.

FIG. 11 illustrates how the integrity value discussed above can be used in a hierarchical manner to be able to authenticate a large address range with a single integrity value. As shown, integrity values can be generated for a series of data blocks $1020_1$, $1020_2$ ... $1020_n$. For example, if an integrity value is one-eighth the size of the data, and if integrity values are generated for 8 data blocks, it will yield a collection of 8 integrity values that are equal in size to one data block. This collection of integrity values $1130_1$, $1130_2$, $1130_n$ can then be considered a block of data to be authenticated, and another layer of integrity value 1110 is generated that authenticates the previous layer of 8 integrity values. This added integrity value is referred to as a composite integrity value, having been derived from multiple other integrity values.

Continuing this approach, a large address space could be divided into successive layers of integrity values so that the entire space is eventually summarized in a single composite integrity value. This composite integrity value could be maintained in persistent storage associated with, for example, the data access control function. Any change to the address space would be reflected in a change to the single integrity value.

Figure 12:
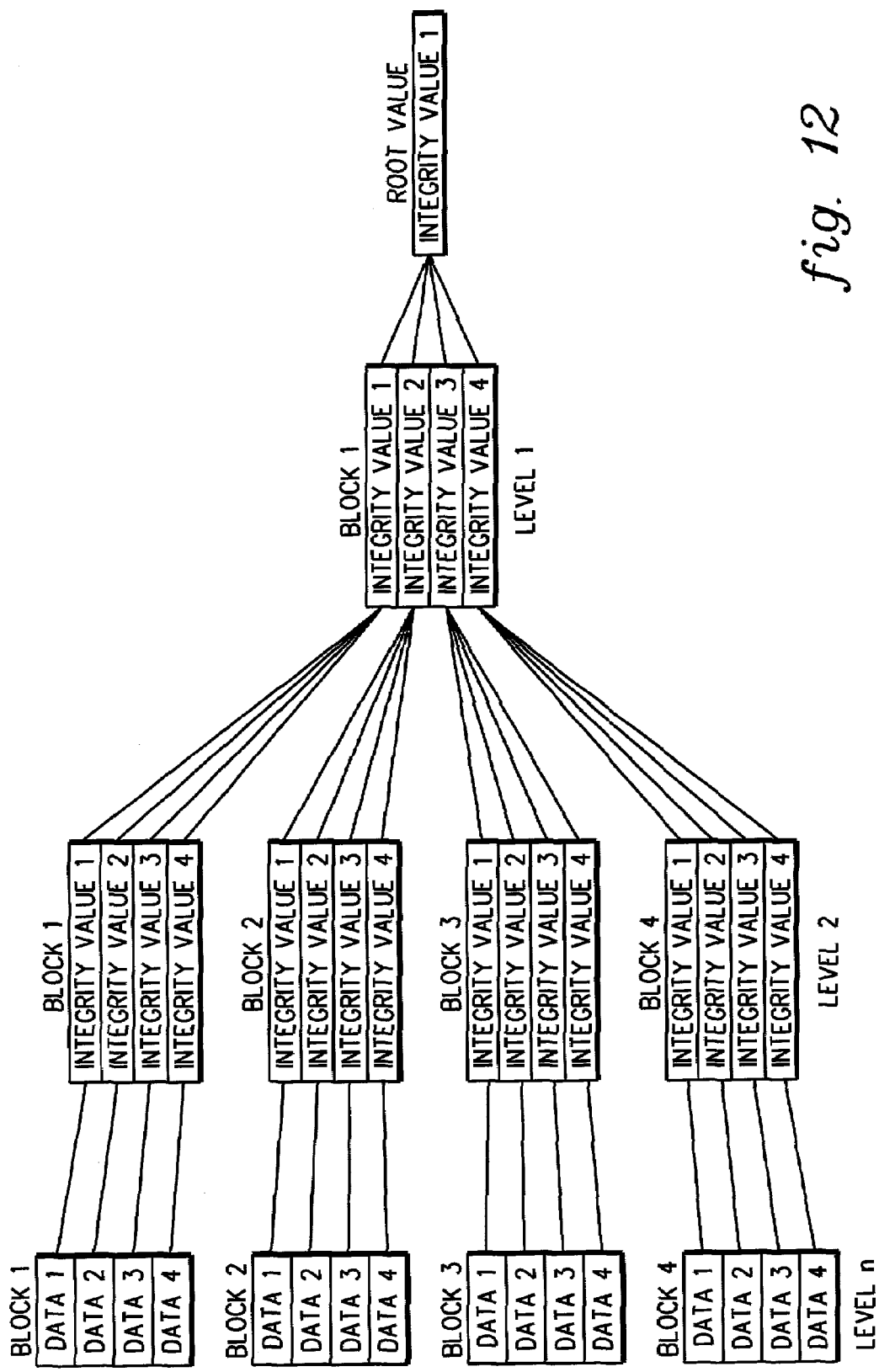
FIG. 12 depicts a more detailed example of cascading integrity values for facilitating data authentication, in accordance with an aspect of the present invention.

FIG. 12 illustrates an application of the cascading integrity value concept depicted in FIG. 11. Again, arbitrarily large address regions can be authenticated with a single integrity value through the use of multiple layers of integrity values. As shown in FIG. 12, where the integrity value is one-fourth the size of the data block, a root integrity value can be used to authenticate a next four integrity values, which are labeled level 1. Each of these integrity values in turn authenticates another four integrity values, labeled in level 2. This process continues until the level n-1 integrity values authenticate the actual data blocks stored in level n.

As noted above, the root integrity value can be stored in on-chip persistent memory so that it is not possible to circumvent the authentication process through the manipulation of external memory.

Figure 13:
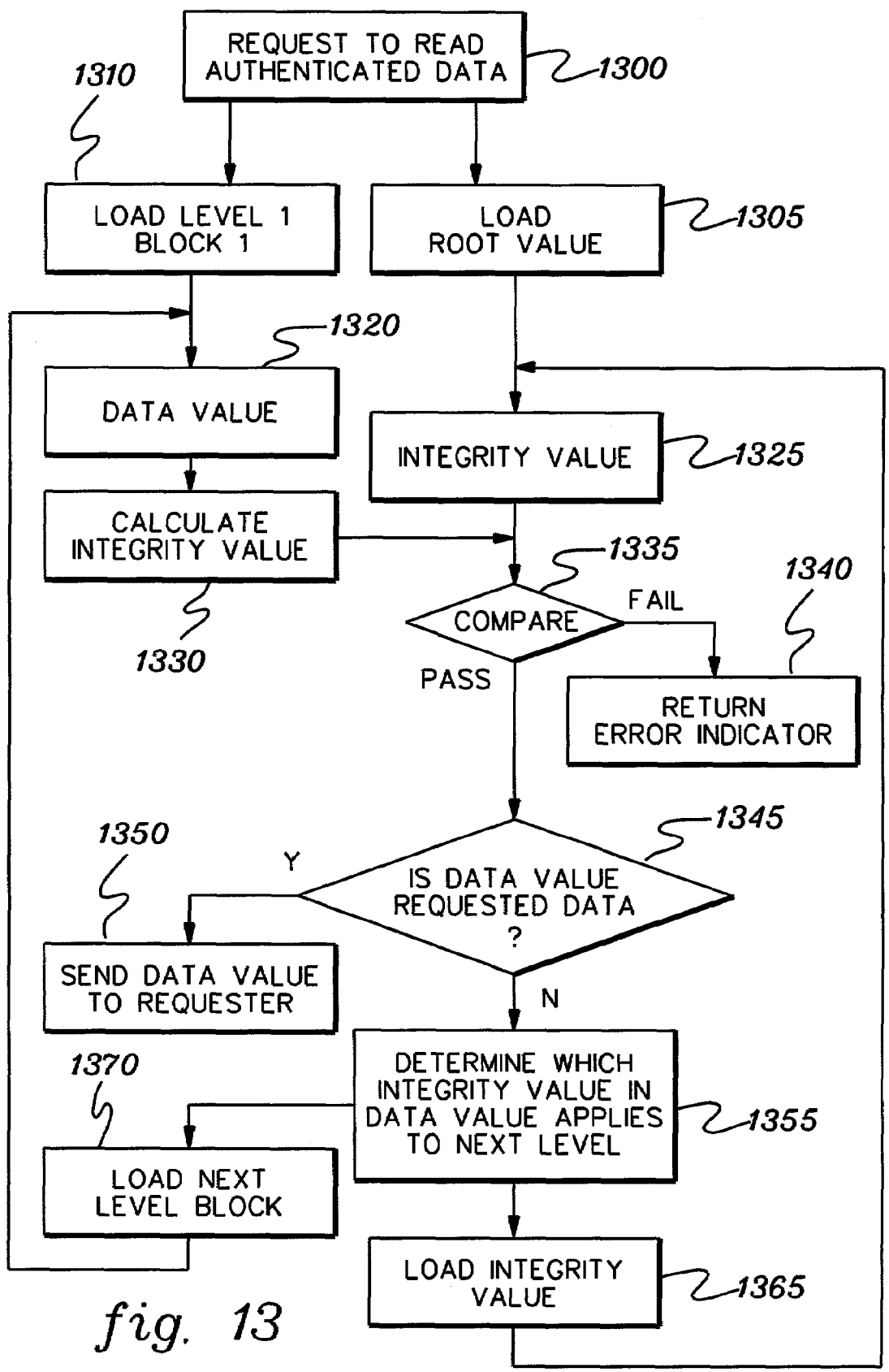
FIG. 13 depicts one embodiment of a data authentication process employing cascading integrity values, in accordance with an aspect of the present invention.

FIG. 13 illustrates a process which can be used with the data structure described in FIG. 12, as part of an authenticated read operation. As shown, a read request is received 1300, and the root value 1305 is loaded as the initial integrity value. The level 1 integrity values 1310 (using the nomenclature of FIG. 12) are loaded as the data to be authenticated 1320. An integrity value is calculated 1330 from the data value 1320, and the result is compared 1335 with the loaded integrity value 1325. If the two do not match, an error indication is indicated 1340. If the integrity values do match, a check is made to see whether the current data value is the data that was originally requested 1345. If so, the data is returned to the requester 1350. If "no", then the data is by definition a of integrity values for the next level 1355. The appropriate value is loaded as the next integrity value 1365 to be used, and the corresponding data value 1370 is loaded from memory. The process continues through all levels until the data requested is reached and returned to the requestor.

A similar process is used for an authenticated write operation (not shown). However, in this case, when the request for a write is received, the data associated with the request is stored immediately and the appropriate integrity value is calculated and loaded into the corresponding location in the next level where it modifies the value of the current integrity value for that level. Therefore, the next level of integrity value is recalculated, and the process is continued until a new value is recalculated and stored for the root value.

As a variation on the write operation, if the original request to write data is not the same size as a full data block, the previous value for the data block can be first read, and then the portion of the data block that is to be updated can be modified, with the result written back as a full data block. This allows a correct calculation of the associated integrity value.

Those skilled in the art will note that the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A data authentication method for an integrated device having multiple functional masters, the multiple functional masters having multiple master ids, said method comprising:

defining different levels of data access security to the multiple functional masters, where the different levels of data access security are predefined in an access table, the access table enforcing the defined access rights for the multiple functional masters to ensure security within the integrated device;

passing a data request, comprising an address associated with requested data, from a functional master through a data access control function disposed within a data path between a bus controller and a slave device coupled to memory, the data access control function residing within a secure memory subsystem of the integrated device;

responsive to the data request, selectively authenticating the requested data by the data access control function transparent to the functional master of the integrated device initiating the data request, the selectively authenticating comprising selectively verifying integrity of the requested data by the data access control function within the secure memory subsystem based on a master ID of the requesting master, the data access level for the requesting master defined in the access table and the address of the requested data, the verifying integrity employing an encrypted integrity check value comprising an encrypted digest of the requested data, the encrypted digest being an encrypted reduced version of the requested data;

when authenticating the requested data, deciding by the data access control function, with reference to the data access level of the requesting master, whether to decrypt the data when the request is a read request, and whether to encrypt the data when the request is a write request; and wherein the verifying integrity employs a common encryption/decryption engine of the data access control function when encrypting/decrypting integrity check values as used for encrypting/decrypting the requested data.

2. The method of claim 1, wherein the selectively authenticating further comprises:

obtaining a predetermined first integrity value representative of the requested data;

employing a data address associated with the data request to read encrypted, requested data responsive to the data request;

decrypting, by the data address control function, the encrypted, requested data;

calculating a second integrity value from the decrypted requested data; and comparing the first integrity value and the second integrity value to authenticate the requested data, and with authentication thereof, returning the requested data to the functional master initiating the data request.

3. The method of claim 2, wherein the obtaining comprises:

calculating an integrity value address from the data address associated with the data request wherein the calculating includes employing an integrity table address;

generating a request to read an encrypted integrity value from a secure integrity table; and receiving and decrypting the read encrypted integrity value by the data access control function to obtain the first integrity value representative of the requested data.

4. The method of claim 1, further comprising receiving by the data access control function a request to write data, and wherein the selectively authenticating further comprises facilitating subsequent authentication of the write data by:

storing an encrypted version of the write data;

calculating an integrity value from the write data, and encrypting the integrity value;

calculating an integrity value address using a write data address associated with the write data; and storing the encrypted integrity value using the calculated integrity value address.

5. The method of claim 4, wherein the selectively authenticating further comprises:

encrypting, by the data access control function, the write data of the write request and storing the encrypted write data, wherein the encrypted write data and the encrypted integrity value can both be retrieved in accordance with a subsequent read request to read requested data.

6. The method of claim 5, wherein receipt of the subsequent read request by the data access control function initiates retrieval of the encrypted requested data and the encrypted integrity value associated therewith, as well as decryption of the encrypted requested data and decryption of the encrypted integrity value for transparent authentication of the requested data prior to forwarding thereof to a functional master initiating the subsequent read request.

7. The method of claim 6, wherein the storing of the encrypted write data and the storing of the encrypted integrity value associated therewith occur such that the encrypted write data and the associated encrypted integrity value are retrievable in a single read operation.

8. The method of claim 1, wherein the selectively authenticating includes employing cascading integrity values, the cascading integrity values including at least one composite integrity value maintained by the data access control function, the at least one composite integrity value comprising an integrity value derived from other integrity values.

9. The method of claim 8, further comprising maintaining the at least one composite integrity value in persistent storage associated with the data access control function.

10. The method of claim 1, wherein the verifying integrity comprises for a read request employing a saved encrypted first integrity check value comprising a previously encrypted digest of the requested data, the previously encrypted digest being an encrypted reduced version of the requested data previously encrypted employing the same encryption/decryption engine of the data access control function as employed to encrypt the requested data itself, the verifying integrity of the requested data comprising:

retrieving and decrypting the encrypted first integrity check value, and retrieving and decrypting the encrypted requested data;

generating a second integrity check value using a same mathematical function as employed in generating the first integrity check value; and comparing the first and second integrity check values, and if matching, the requested data is authenticated, otherwise, the requested data has been corrupted and corrective action is to be taken.

11. The method of claim 1, wherein the verifying integrity comprises for a write request:

generating a first integrity check value as a mathematically condensed version of the requested data to be secured and authenticated;

encrypting the requested data and encrypting the first integrity check value using a common encryption/decryption engine of the data access control function; and storing the encrypted integrity check value and storing the encrypted requested data in memory, wherein encrypting the integrity check value employing the encryption/decryption engine of the data access control function simplifies integrity value calculations employed in protecting the requested data.

12. A data authentication system for an integrated device having multiple functional masters, the multiple functional master having multiple master ids, said system comprising:

means for defining different levels of data access security to the multiple functional masters, where the different levels of data access security are predefined in an access table, the access table enforcing the defined access rights for the multiple functional masters to ensure security within the integrated device;

a data access controller for receiving a data request from a functional master, the data request comprising an address associated with requested data, and the data access controller being disposed in a data path between a bus controller and a slave device coupled to memory, the data access control function residing within a secure memory subsystem of the integrated device;

means for selectively authenticating the requested data at the data access controller responsive to the data request, wherein the means for selectively authenticating is transparent to the functional master of the integrated device initiating the data request, the selectively authenticating comprising means for selectively verifying integrity of the requested data by the data access control function within the secure memory subsystem based on a master ID of the requesting master, the data access level for the requesting master defined in the access table and the address of the requested data, the means for selectively verifying integrity employing an encrypted integrity check value comprising an encrypted digest of the requested data, the encrypted digest being an encrypted reduced version of the requested data;

wherein the means for selectively authenticating comprises means for deciding by the data access controller, with reference to the data access level of the requesting master, whether to decrypt the data when the request is a read request, and whether to encrypt the data when the request is a write request; and wherein the means for selectively verifying integrity further employs a common encryption/decryption engine of the data access control function when encrypting/decrypting integrity check values as used for encrypting/decrypting the requested data.

13. The system of claim 12, wherein the means for selectively authenticating further comprises:

means for obtaining a predetermined first integrity value representative of the requested data;

means for employing a data address associated with the data request to read encrypted, requested data responsive to the data request;

means for decrypting, by the data address controller, the encrypted, requested data;

means for calculating a second integrity value from the decrypted requested data; and means for comparing the first integrity value and the second integrity value to authenticate the requested data, and with authentication thereof, for returning the requested data to the functional master initiating the data request.

14. The system of claim 13, wherein the means for obtaining comprises:

means for calculating an integrity value address from the data address associated with the data request, wherein the means for calculating includes means for employing an integrity table address;

means for generating a request to read an encrypted integrity value from a secure integrity table; and means for receiving and decrypting the read encrypted integrity value by the data access controller to obtain the first integrity value representative of the requested data.

15. The system of claim 12, further comprising means for receiving by the data access controller a request to write data, and wherein the means for selectively authenticating further comprises means for facilitating subsequent authentication of the write data by:

storing an encrypted version of the write data;

calculating an integrity value from the write data, and encrypting the integrity value;

calculating an integrity value address using a write data address associated with the write data; and storing the encrypted integrity value using the calculated integrity value address.

16. The system of claim 15, wherein the means for selectively authenticating further comprises:

means for encrypting, by the data access controller, the write data of the write request and storing the encrypted write data, wherein the encrypted write data and the encrypted integrity value can both be retrieved in accordance with a subsequent read request to read requested data.

17. The system of claim 16, wherein receipt of the subsequent read request by the data access controller initiates retrieval of the encrypted requested data and the encrypted integrity value associated therewith, as well as decryption of the encrypted requested data and decryption of the encrypted integrity value for transparent authentication of the requested data prior to forwarding thereof to a functional master initiating the subsequent read request.

18. The system of claim 17, wherein the storing of the encrypted write data and the storing of the encrypted integrity value associated therewith occur such that the encrypted write data and the associated encrypted integrity value are retrievable in a single read operation.

19. The system of claim 12, wherein the means for selectively authenticating includes means for employing cascading integrity values, the cascading integrity values including at least one composite integrity value maintained by the data access controller, the at least one composite integrity value comprising an integrity value derived from other integrity values.

20. The system of claim 19, further comprising means for maintaining the at least one composite integrity value in persistent storage associated with the data access control function.

21. The system of claim 12, wherein the means for selectively verifying integrity comprises for a read request means for employing a saved encrypted integrity check value comprising a previously encrypted digest of the requested data, the previously encrypted digest being an encrypted reduced version of the requested data previously encrypted employing the same encryption/decryption engine of the data access control function as employed to encrypt the requested data itself, the means for selectively verifying integrity of the requested data further comprising:

means for retrieving and decrypting the encrypted first integrity check value, and for retrieving and decrypting the encrypted requested data;

means for generating a second integrity check value using a same mathematical function as employed in generating the first integrity check value; and means for comparing the first and second integrity check values, and if matching, the requested data is authenticated, otherwise, the requested data has been corrupted and corrective action is to be taken.

22. The system of claim 12, wherein the means for selectively verifying integrity comprises for a write request:
   means for generating an integrity check value as a mathematically condensed version of the requested data to be secured and authenticated;
   means for encrypting the requested data and encrypting the first integrity check value using a common encryption/decryption engine of the data access control function; and
   means for storing the encrypted integrity check value and for storing the encrypted requested data in memory, wherein employing the encryption/decryption engine of the data access control function to encrypt the integrity check valve simplifies integrity value calculations employed in protecting the requested data.

23. At least one program storage device readable by a machine, tangibly embodying at least one program of instructions executable by the machine to perform a data authentication method for an integrated device having multiple functional masters, the multiple functional masters having multiple master ids, the method comprising:
   defining different levels of data access security to the multiple functional masters, where the different levels of data access security are predefined in an access table, the access table enforcing the defined access rights for the multiple functional masters to ensure security within the integrated device;
   passing a data request, comprising an address associated with requested data, from a functional master through a data access control function disposed within a data path between a bus controller and a slave device coupled to memory, the data access control function residing within a secure memory subsystem of the integrated device;
   responsive to the data request, selectively authenticating the requested data by the data access control function transparent to the functional master of the integrated device initiating the data request, the selectively authenticating comprising selectively verifying integrity of the requested data by the data access control function within the secure memory subsystem based on a master ID of the requesting master, the data access level for the requesting master defined in the access table and the address of the requested data, the verifying integrity employing an encrypted integrity check value comprising an encrypted digest of the requested data, the encrypted digest being an encrypted reduced version of the requested data;
   when authenticating the requested data, deciding by the data access control function, with reference to the data access level of the requesting master, whether to decrypt the data when the request is a read request, and whether to encrypt the data when the request is a write request; and
   wherein the verifying integrity employs a common encryption/decryption engine of the data access control function when encrypting/decrypting integrity check values as used for encrypting/decrypting the requested data.

* * * * *